(12) United States Patent
Chen et al.

(10) Patent No.: US 10,955,717 B1
(45) Date of Patent: Mar. 23, 2021

(54) ELECTROCHROMIC DEVICE BASED ON TWO COLOR LAYERS AND METHODS OF FABRICATING SAME

(71) Applicant: AMBILIGHT INC., Milpitas, CA (US)

(72) Inventors: Ke Chen, Lafayette, IN (US); Jianguo Mei, West Lafayette, IN (US)

(73) Assignee: AMBILIGHT INC., Milpitas, CA (US)

( * ) Notice: Subject to any disclaimer, the term of this patent is extended or adjusted under 35 U.S.C. 154(b) by 0 days.

(21) Appl. No.: 16/999,921

(22) Filed: Aug. 21, 2020

Related U.S. Application Data

(63) Continuation of application No. PCT/US2020/035407, filed on May 29, 2020.

(51) Int. Cl.
| | |
|---|---|
| *G02F 1/15* | (2019.01) |
| *G02F 1/1523* | (2019.01) |
| *G02F 1/163* | (2006.01) |
| *G02F 1/1516* | (2019.01) |
| *G02F 1/155* | (2006.01) |

(52) U.S. Cl.
CPC .......... *G02F 1/1525* (2013.01); *G02F 1/155* (2013.01); *G02F 1/15165* (2019.01); *G02F 1/163* (2013.01); *G02F 2001/164* (2019.01)

(58) Field of Classification Search
CPC .... G02F 1/1525; G02F 1/155; G02F 1/15165; G02F 1/163; G02F 2001/164
See application file for complete search history.

(56) References Cited

U.S. PATENT DOCUMENTS

| | | | |
|---|---|---|---|
| 2006/0262377 A1* | 11/2006 | Kojima | G02F 1/155 359/265 |
| 2009/0122412 A1 | 5/2009 | Steenblik et al. | |
| 2010/0142027 A1 | 6/2010 | Tatsuura et al. | |
| 2010/0309538 A1 | 12/2010 | Tatsuura et al. | |
| 2016/0097959 A1 | 4/2016 | Bruizeman et al. | |
| 2017/0235203 A1* | 8/2017 | Yamamoto | G02F 1/155 359/268 |

OTHER PUBLICATIONS

International Search Report and Written Opinion for application No. PCT/US2020/035407 dated Sep. 23, 2020 (6 pages).

* cited by examiner

*Primary Examiner* — Tuyen Tra
(74) *Attorney, Agent, or Firm* — Sheppard Mullin Richter & Hampton LLP

(57) ABSTRACT

An electrochromic device with one pigmentary color layer and one structural color layer is disclosed. The pigmentary color layer comprises electrochromic materials, which allow reversible and gradient switches between a colored state and a bleached state by electric field. In a colored state, the electrochromic device presents saturated pigmentary-structural additive color. In a bleached state, the structural color gradually vanished and leads to the optical transmissive state. The color coupling between these two color layers provides the disclosed devices with broader color gamut and angle-dependent optical response. Multiplexed and patterned devices have been further fabricated to demonstrate bio-mimic camouflage potentials.

15 Claims, 18 Drawing Sheets

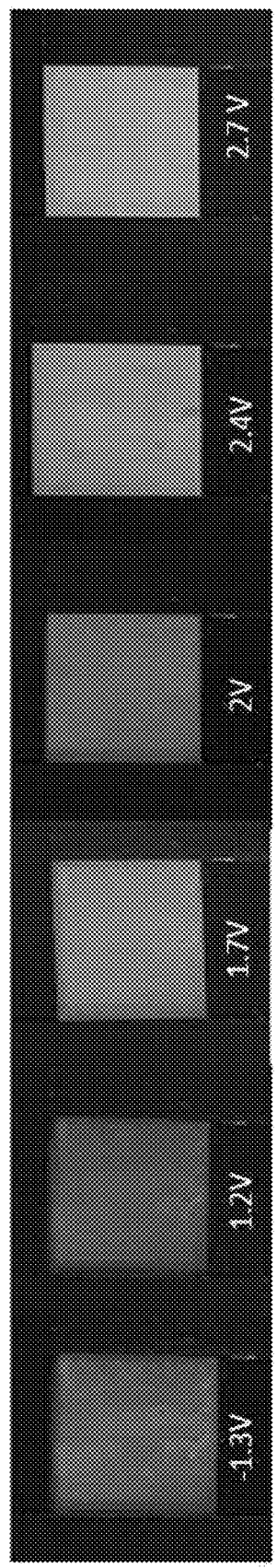
FIG. 9(A) -1.3V  FIG. 9(B) 1.2V  FIG. 9(C) 1.7V  FIG. 9(D) 2V  FIG. 9(E) 2.4V  FIG. 9(F) 2.7V FIG. 14(A)
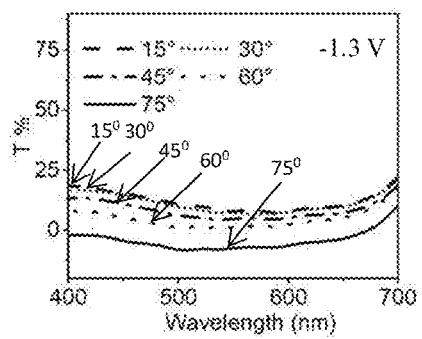
FIG. 14(B)
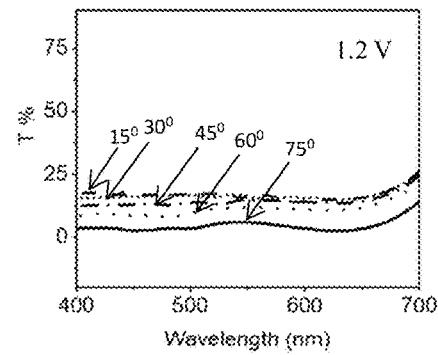
FIG. 14(C)
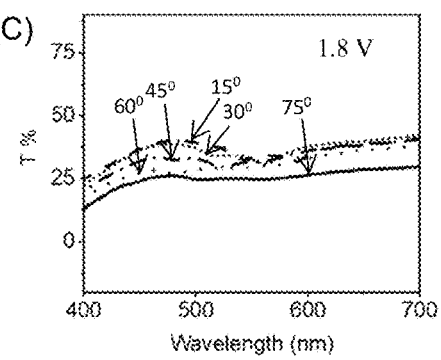
FIG. 14(D)
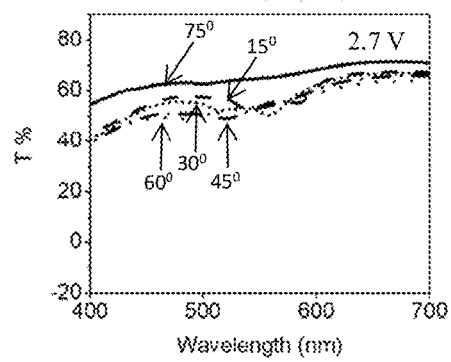
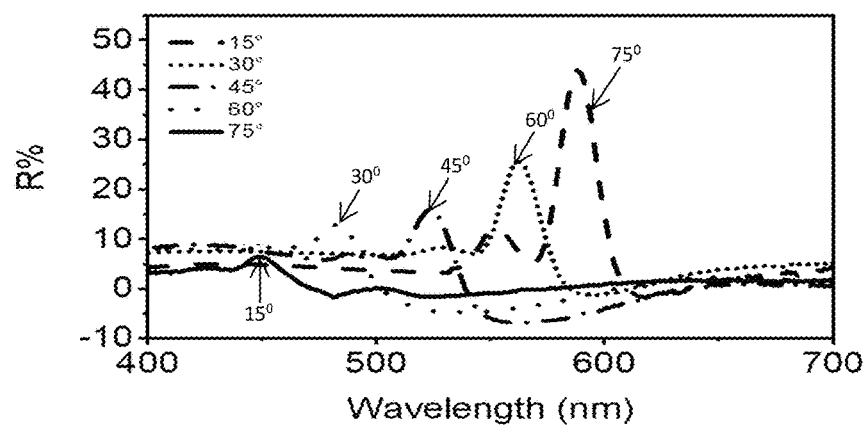
FIG. 14(E)

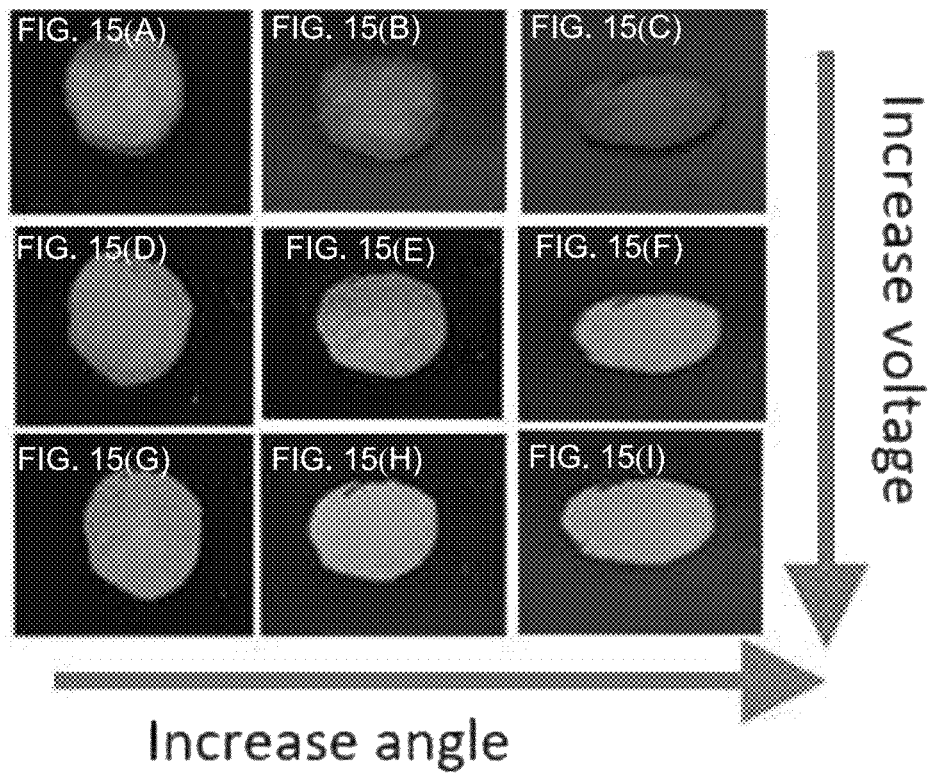
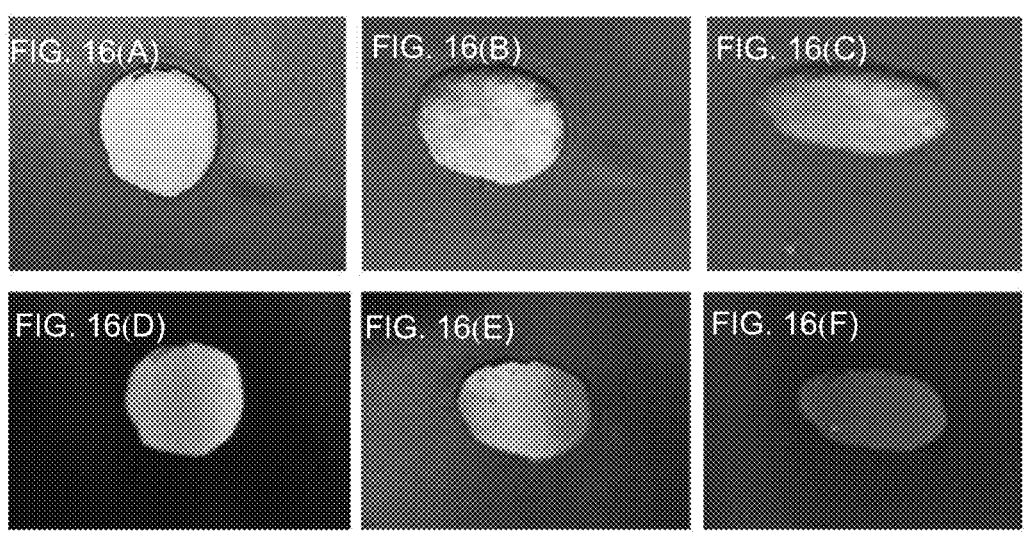

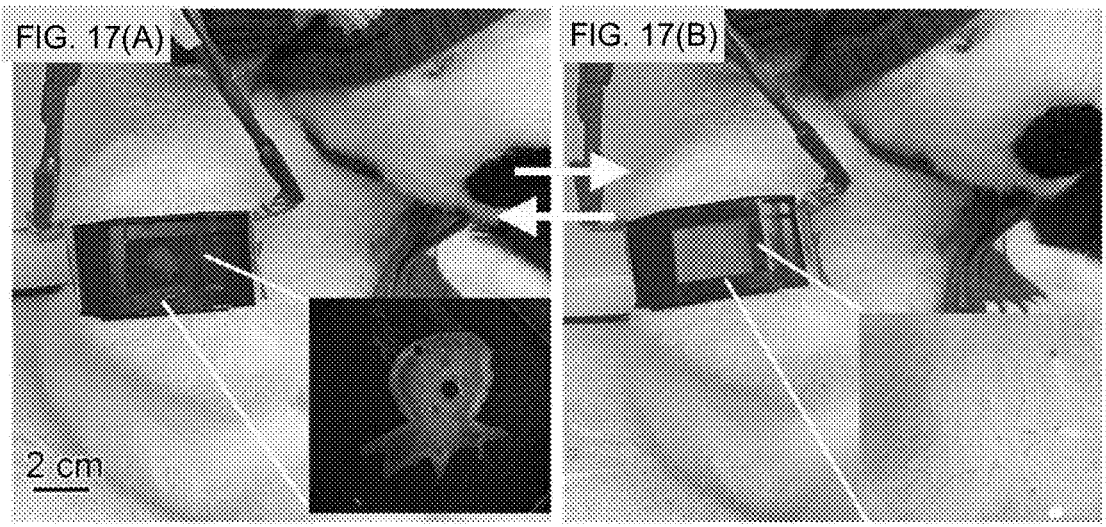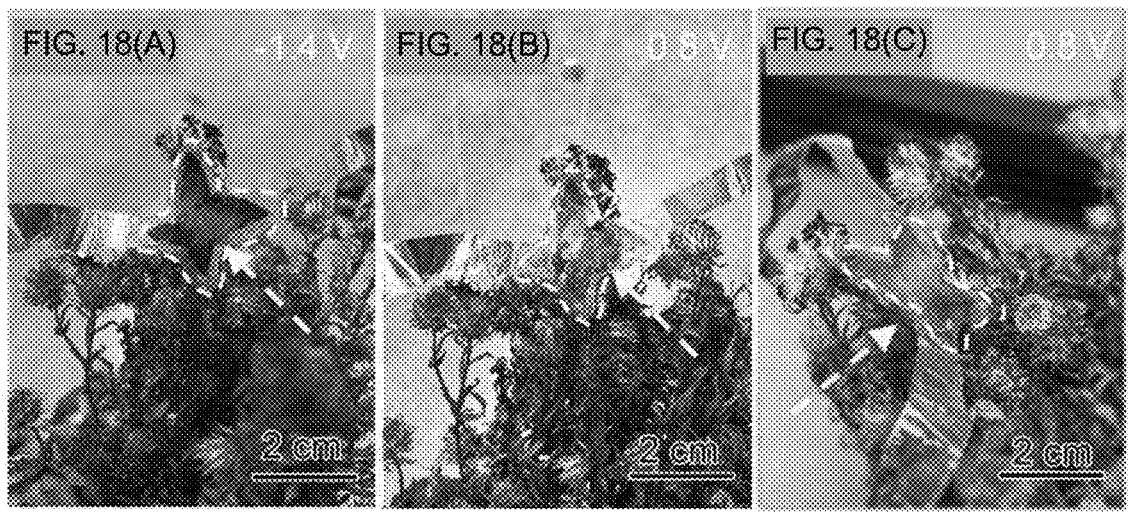

Active area

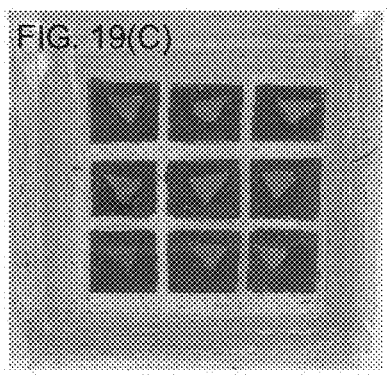
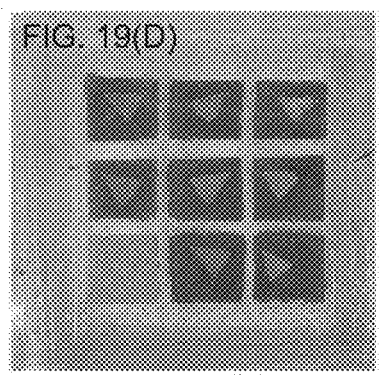
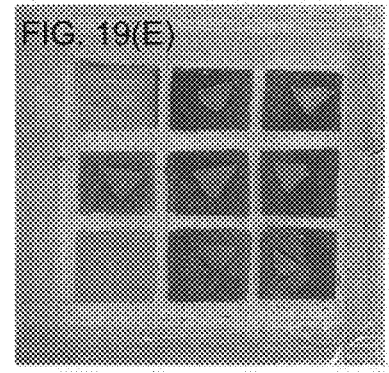
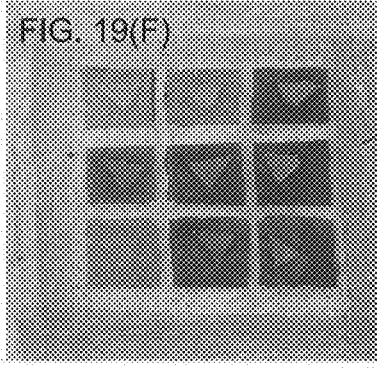

__US 10,955,717 B1__

ELECTROCHROMIC DEVICE BASED ON TWO COLOR LAYERS AND METHODS OF FABRICATING SAME

CROSS REFERENCE TO RELATED APPLICATION

The present application is a continuation application of International Application No. PCT/US2020/035407, filed on May 29, 2020, and entitled "AN ELECTROCHROMIC DEVICE BASED ON TWO COLOR LAYERS AND METHODS OF FABRICATING SAME," the content of which is incorporated herein by reference in its entirety.

TECHNICAL FIELD

The present disclosure is generally related to a new electrochromic device, and more particularly, a new electrochromic device containing a pigmentary color layer and a structural color layer, and also directed to a method for preparing the electrochromic device

BACKGROUND

Some animals, such as cephalopod, fish and butterflies, are able to dynamically change skin coloration states as means of communication, camouflage, predation or regulating body temperature. One kind of organ and one kind of cell are mainly responsible for their color states, namely chromatophore and iridophore respectively. Chromatophores are organs that contain a large amount of pigment cells and are usually mounted on radial muscles. With the expansion and contraction of the muscles, these pigment cells could reversibly spread out or shrink into little invisible spots (0.1 mm in area). This process lends animals to dynamically change gradient transparency or patterns on demand. Iridophores are stacks of very thin cells which give rise to structural colors, resulting from reflection of light at the specific wavelengths by their nanocrystals. The nanocrystals polarize light and cause angel dependent color which enable animals to hide from predators. These two organs are lying adjacently underneath skin and function synergistically, which offers color tunability that neither of them can achieve alone, such as expressing broaden color gamut, transparency, and angel-dependent visibility. Such a cooperative interaction enables animals exhibit impressive color adaptability to their surrounding environments.

Learning from the nature, coupling both pigmentary colors (Chromatophores) and structural colors (Iridophores) can be an efficient way to produce more complex and dynamic colors, and thus to meet the requirements of various functions, such as protective coatings, functional displays and camouflage platforms. However, this effort has rarely been realized and so far, tunable coupling of pigmentary color with structural color in an electrochromic device has not been reported.

SUMMARY

Described herein are a new electrochromic device and a method for preparing the electrochromic device.

The disclosure describes an electrochromic device comprising a pigmentary color layer and a structural color layer. The pigmentary color layer comprises the pigmentary color materials which produce colors by the light absorption, while the structural color layer comprises the structural color materials which produce colors by the physical interaction of periodic structures with light, such as reflection and refraction. The structural color layer comprises a structural color material which has an angel-dependent light variation. Both color layers are placed along the optical path. The top color layer along the optical path has a transmittance and a thickness which allow the disclosed electrochromic device to produce noticeable angel-dependent light variations for corresponding applications. The noticeable angel-dependent light variations may include variations on different colors or different light intensities or both. In some embodiments, the metastable colloidal crystals based structural color layer is disposed on the top of electrochromic conjugated polymer (ECP) based pigmentary color layer along the optical path in the example electrochromic device. The structural color layer has a thickness of around 1 mm and a transmittance of at least 75% across the majority of UV-vis range at an amorphous domain. When applying a voltage between −1.3V and 2.5V, the underneath ECP based pigmentary color layer is partially bleached and the device demonstrates visibility variation of decreased visibility with increasing viewing angels that can be observed by naked eyes.

The pigmentary color layer and the structural color layer can be placed either directly adjacently or spaced by other compartments. At least the pigmentary color layers comprise electrochromic materials and the electrochromic materials are placed in a closed electric circuit within the electrochromic device. In some embodiments, all the other compartments on top of the structural color layer along the optical path are transparent. This coupling between two color layers enables the disclosed electrochromic device to reversibly switch between saturated colored state and optical transparence by applying an electric voltage. It also broadens the color gamut and boost the color expression capability which neither can achieve alone. Further. the disclosed electrochromic device exhibits angle-dependent light variation: the color blueshift with increasing view angle and is only visible from certain angles at specific voltages.

Various embodiments described herein are involved with position of the two color layers along the optical path in the present disclosure. In some embodiments, the structural color layers are placed on top of the pigmentary color layers along the optical path. In some embodiments, the pigmentary color layers are placed on the top along the optical path. The top color layer has a transmittance and a thicknesses, so that the electrochromic devices of the disclosure can produce noticeable angel-dependent light intensity variations for corresponding applications. The two color layers can be placed either directly adjacently or spaced by other compartments.

Various embodiments described herein are involved with electrochromic materials for at least pigmentary color layers in the present disclosure. In some embodiments, the pigmentary color layer comprises electrochromic materials while the structural color layer contains no electrochromic materials. In some embodiments, both pigmentary color layer and structural color layer comprise electrochromic materials. The electrochromic materials can be selected from both inorganic materials and organic materials. In some embodiments, electrochromic conjugated polymers (ECPs) are used as electrochromic materials in the device. In some embodiments, acrylate-substituted propylenedioxythiophene (ProDOT) polymers are used in the device.

Various embodiments described herein are directed to structure designs for assembling the electrochromic devices in the present disclosure. The structure designs described herein comprise two color layers. The two color layers can be placed directly adjacently. In some embodiments, sandwich structure designs with two color layers sandwiched between electrodes are used; in some embodiments, lateral structure designs with two color layers placed laterally between two laterally arranged electrodes are used. In some embodiments, liquid cell structure designs are used with liquid electrolyte and no greater than one liquid color layer. Two color layers can be also spaced by the other compartments, in another word, while the pigmentary color layer is interposed between two electrodes, the structural color layer is disposed on an outer surface of one of the two electrodes. In some embodiments, the structural color materials can be directly coated on an existing ECD. At least pigmentary color layer has electrochromic materials. The color layers with electrochromic material are placed in a closed electric circuit in the electrochromic device. Sharable or separated electric circuit can be used for different applications when both color layers comprise electrochromic materials. When the structural color layer comprises insulting color materials, structural color materials can be embedded into electrolyte to form one consolidated structural color layer; or the structural color materials can be directly coated onto an existing ECD, in another word, while the pigmentary color layer is interposed between two electrodes, the structural color layer is disposed on an outer surface of one of the two electrodes. When the structural color layer comprises conducting color materials, structural color materials can either be embedded into electrolyte to form one consolidated structural color layer or form an individual layer directly or be directly coated onto an existing ECD.

The electrochromic material in the pigmentary color layer is selected from one or more redox-active inorganic or organic based electrochromic materials, or any combination thereof. Example inorganic pigmentary color materials may be selected from one or more oxides of Ti, V, Nb, Ta, Cr, Mo, W, Mn, Fe, Co, Ir, Ni, Cu, Ce, or Zn or a mixed metal oxide or a doped metal oxide or any combination thereof, among others. Example organic pigmentary color materials may be selected from one or more of viologens including poly(decylviologen) and its derivatives, electrochromic conducting polymers including polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and copolymers thereof, metallopolymers, metallophthalocyanines, or the copolymers containing acceptor units including benzothiadiazole, benzoselenadiazole, benzooxazole, benzotriazole, benzoimidazole, quinoxalines, or diketopyrrolopyrroles, or any combination thereof, among others.

In some embodiments, the pigmentary color layer comprises an electrochromic conjugated polymer (ECP) that can be switched between colored state and bleached state by electric field. In some embodiments, the pigmentary color layer comprises acrylate-substituted propylenedioxythiophene (ProDOT) polymers with various colors, for example ECP-black which yields black color.

In some embodiments, the structural color layer materials can be selected from one or more structural color materials. Example materials include materials produced by lithography techniques (for example, magnetic nanoparticles), liquid crystals (for example, cholesteryl benzoate and its derivate, phospholipids, $ZnCl_2$), block copolymers (for example, PS-b-P2VP, PLA-b-PnBA) and colloidal particles (for example, $SiO_2$, ZnO, Ag nanoparticles).

In some embodiments, the structural color layer materials comprise metastable colloidal crystals which include both crystalline domains and amorphous domains. The amorphous domains need to transmit light to some degree (for example transparent or semi-transparent) to forms unobstructed light pathways for the pigmentary color layer. The crystalline domains give rise to the structure color. In some embodiments, the structural color layer comprises $SiO_2$/EG (ethyl glycol) non-closed packed colloidal crystals which include both crystalline domains and amorphous domains.

In another aspect, the present disclosure is directed to methods of preparing the electrochromic device described immediately above. The method includes preparation of a pigmentary color layer and a structural color layer. At least the pigmentary color layer comprises electrochromic materials and the top color layer has appropriate transmittance and thickness which allow the disclosed electrochromic device to produce noticeable angel-dependent light variations for corresponding applications and the structural color material can be embedded into the electrolyte to form one consolidated structural color layer or be directly coated onto an existing ECD if there is any insulting color material. The final electrochromic device is fabricated with the electrochromic materials placed in a closed electric circuit. Both color layers are placed along the optical path. The two color layers can be placed either directly adjacently or spaced by other compartments and all the other compartments on top of the structural color layer along the optical path may be transparent.

In some embodiments, the methods to make the disclosed electrochromic device include: preparation of a pigmentary color layer comprising a ECP; preparation of a consolidated structural color layer comprising a non-closed packed colloidal crystal embedded in electrolyte; and fabrication of the final device with a sandwich structure design by placing both color layers in a closed electric circuit with transparent substrates, electrodes, an electrolyte layer and an ion storage layer.

In some embodiments, when the substrates and materials from each layer are flexible, each layer can be cut and bent into a desired shape before or after assembly, so that the entire device can be fabricated into a desired shape for various applications, including wearable or curved electronic devices.

In some embodiments, wherein patterned electrodes and substrates can be used to assemble multiplex devices, so the device can be used for high-resolution display and camouflage pattern construction with computational programming.

Due to the dynamic color coupling and unique angel-dependent light variation that can be detected by naked eyes or machines, the electrochromic devices in the present disclosure can be used in various applications including, for example, anti-counterfeiting packaging, bills or goods; anti-voyeur screens; logo display, vehicles with camouflage purposes, protective coating of the device to reflect harmful wavelength.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings below. For the purpose of illustrating the invention, the drawings show aspects of one or more embodiments of the invention. However, it should be understood that the present invention is not limited to the precise arrangements and instrumentalities shown in the drawings.

FIGS. 1 (A)-(B) are the example working mechanisms of one example electrochromic device (ECD).

FIGS. 5 (A)-(B) contain the following graphs of an ECP-black used as pigmentary color layer.

FIGS. 6 (A)-(D) contain the following graphs of a metastable colloidal crystal used as structural color layer.

FIGS. 8 (A)-(B) are the spectra for an ECD when the voltage increases from −1.3 V to 2.7 V.

FIGS. 9 (A)-(F) are images of an electrochromic device for illustration of the color changes at different voltages, from left to right, −1.3V, 1.2V, 1.7V, 2V, 2.4V, and 2.7V, according to one example embodiment.

FIGS. 14 (A)-(E) contain the following graphs: transmittance spectra of the disclosed example electrochromic device at incident angels changed from 15° to 75°, according to one example embodiment, at different voltages of −1.3 V (FIG. 14(A)), 1.2V (FIG. 14(B)), 1.8V (FIG. 14(C)), or 2.7V (FIG. 14(D)); and reflectance spectrum (illustrated in FIG. 14(E)) of the same electrochromic device as the incident angels changed from 15° to 75° and there are no significantly differences on reflectance at different voltages.

FIGS. 15 (A)-(I) contains images illustrating the angel-dependent light variation and electric-field tunability of an example electrochromic device, according to one example embodiment. The viewing angles are 0°, 45°, 70° from left to right, and the applied voltages are −1.3 V, 1.5 V, 2.7 V from top to bottom.

FIGS. 16 (A)-(F) contain images illustrating the angel-dependent variation of an example electrochromic device, according to one example embodiment, under high intensity front light (illustrated in FIG. 16(A)-(C)) or under high intensity back light (illustrated in FIG. 16(C)-(D)). The viewing angles are 0°, 45°, 70° from left to right.

FIGS. 17 (A)-(B) are images of an wearable octopus-patterned example electrochromic device mounting on the arm of a toy bear which shows up at neutral state (illustrated in FIG. 17(A)), and hides away (illustrated in FIG. 17(B)) with electric tuning.

FIGS. 18 (A)-(C) are images of an butterfly-shaped example electrochromic device placing in flowers, according to one example embodiment. It shows up at neutral state (illustrated in FIG. 18(A)), becomes transparent after being electric actuated (illustrated in FIG. 18(B)), and can become visible again when viewed from another angle under the same electric condition as (illustrated in FIG. 18(B)).

FIGS. 19 (A)-(F) contain the following graphs: FIGS. 19(C)-(F) are images of the same example multiplex device before (left) and after (right) being selectively actuated with electric fields.

DETAILED DESCRIPTION OF EMBODIMENTS

Figure 1A:
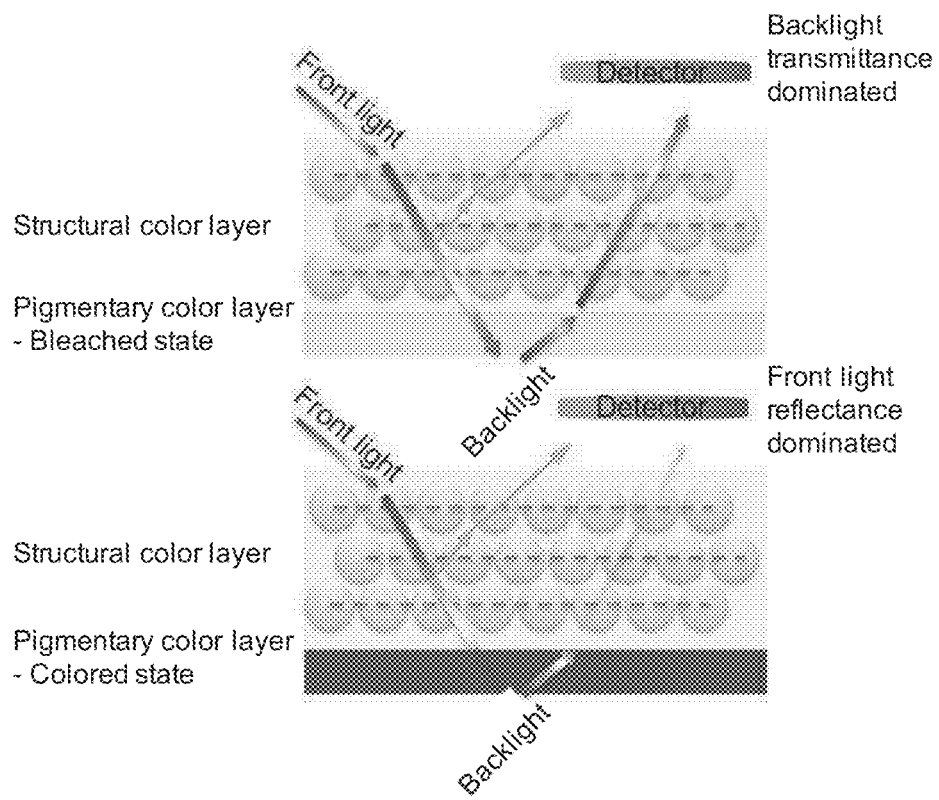
FIG. 1(A) is a schema diagram illustrating the structure design and the optical path of the described example ECD of the present disclosure with electric actuation (upper) and without electric actuation (lower), according to an example embodiment.

In the following description, certain specific details are set forth in order to provide a thorough understanding of various embodiments of the invention. However, one skilled in the art will understand that the invention may be practiced without these details. Moreover, while various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way.

Unless the context requires otherwise, throughout the present specification and claims, the word "comprise" and variations thereof, such as, "comprises" and "comprising"

are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise.

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiments.

Various embodiments described herein are directed to an electrochromic device (ECD) comprising one pigmentary color layer and one structural color layer, wherein at least the pigmentary color layers comprise electrochromic materials and are placed in a closed electric circuit with other compartments in the device. The top color layer along the optical path has a transmittance and a thickness, which allows the disclosed ECD to display versatile color expression as well as noticeable angel-dependent light variations for corresponding applications. The perceived color displayed by the disclosed device is coupled by two types of color sources: one is the transmitted light through the device and the other one is the reflective light from the device. The transmitted light mainly comes from the light transmitted through pigmentary color layer after its absorption. The reflected light mainly comes from the light which are selectively reflected by the structural color layer. So enhanced color expression can be produced by the color coupling of the transmittance spectra from the pigmentary color layer and the reflectance spectra from the structural color layer. The angel-dependent light variation comes from the angel-dependent reflection of the structural color layer, which further enhances the tuning ability of the ECD of the present disclosure.

Various embodiments described herein are involved with positions of the two color layers on the optical path in the present disclosure. In some embodiments, the structural color layers are placed on top of the pigmentary color layers along the optical path. In some embodiments, the pigmentary color layers are placed on the top along the optical path. The top color layer has a transmittance and a thicknesses, so that the electrochromic devices of the disclosure can produce noticeable angel-dependent light variations for corresponding applications.

Various embodiments described herein are involved with electrochromic materials for at least the pigmentary color layers in the electrochromic device of the present disclosure. In some embodiments, pigmentary color layers comprise electrochromic materials while structural color layers contains no electrochromic materials. In some embodiments, both pigmentary color layer and structural color layer comprise electrochromic materials.

The working mechanism of the present disclosure is further illustrated by some example embodiments which have pigmentary color layer containing electrochromic materials and placed on the back of the structural color layer along the optical path as the schema in FIG. 1(A). The perceived color detected by naked eyes or detector is the coupled color from two types of light sources: one is the transmitted light from the light from the back of the device transmitted through the pigmentary color layer after its absorption, and the other one is the reflective light from the light reflected by the structural color layer. When the pigmentary color layer is activated by electric field and in a bleached state, the transmittance of the pigmental color layer is high over the entire visible range, so the transmittance of the disclosed ECD is high over the entire visible range. Thus, more and more backlight can penetrate the pigmentary color layer and couple with the green structure color to make it look pale until close to transparent, as shown by the scheme in upper FIG. 1(A). In contrast, when the pigmentary color layer is in a colored state, since the transmittance from the pigmentary color layer is low, the transmittance of the disclosed ECD is low over the entire visible range and the light perceived by the detector (including naked eyes) comprises mainly the front light reflection from structural color layer, thus the platform appears the color of the structural color layer, as shown by the lower scheme in FIG. 1(A). This color-colorless switch is reversible.

Figure 1B:
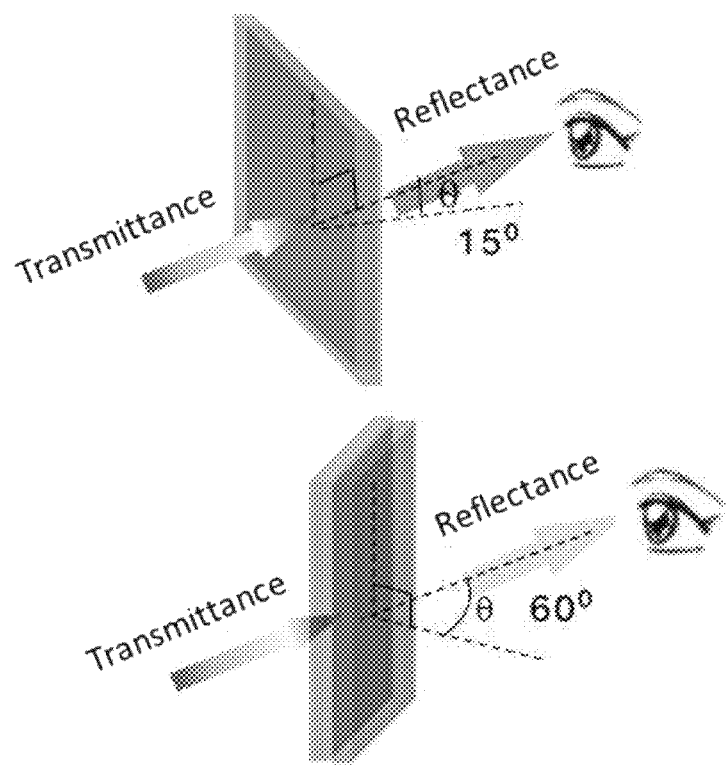
FIG. 1(B) is a schema diagram illustrating that the coupled color can be visible from small or zero viewing angles while become invisible from large angles θ during two-stage transition process, according to one example embodiment.

Besides the color coupling and transparency control mentioned above, angle-dependent light variation can also be achieved by the described ECD of the present disclosure. When viewing the ECD with small (15°) incident angel, the transmitted light from the backward pigmentary color layer travels through the structural color to the front surface of the ECD and couples with the reflected light, as show in upper FIG. 1(B). When viewing at a bigger incident angel (60°), the reflected light of the structural color layer changes (lower intensity according to one example) and further leads to angel-dependent light variation at the front surface of the ECD as shown in lower FIG. 1(B).

Various embodiments described herein are directed to structure designs for assembling the electrochromic devices in the present disclosure. The structure designs described herein comprise two color layers. The two color layers can be placed directly adjacently. In some embodiments, sandwich structure designs with two color layers sandwiched between electrodes are used; in some embodiments, lateral structure designs with two color layers placed laterally between two laterally arranged electrodes are used. In some embodiments, liquid cell structure designs are used with liquid electrolyte and no greater than one liquid color layer. Two color layers can be also spaced by the other compartments. In some embodiments, the structural color materials can be directly coated on an existing ECD. At least pigmentary color layer has electrochromic materials. The color layers with electrochromic material are placed in a closed electric circuit in the electrochromic device. Sharable or separated electric circuit can be used for different applications when both color layers comprise electrochromic materials. When the structural color layer comprises insulting color materials, structural color materials can be embedded into electrolyte to form one consolidated structural color layer or be directly coated on an existing ECD. When the structural color layer comprises conducting color materials, structural color materials can either be embedded into electrolyte to form one consolidated structural color layer or form an individual layer or be directly coated on an existing ECD.

Figure 2:
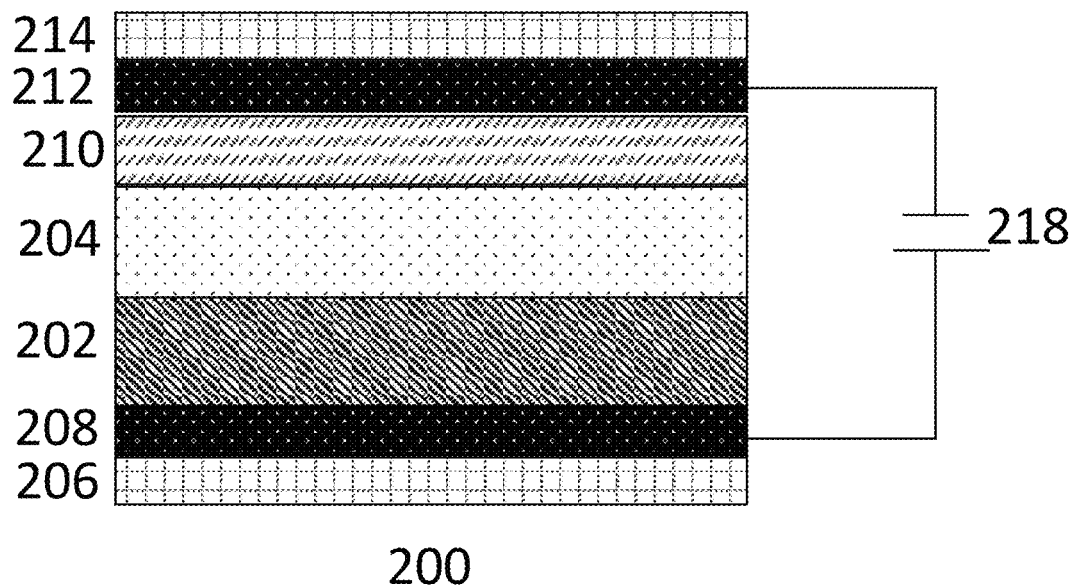
FIG. 2 is a diagram illustrating a cross sectional view of an example sandwich structure design of an ECD, according to one example embodiment.

In some embodiments, the electrochromic devices of the present disclosure are depicted in a sandwich structure design as shown in FIG. 2, according to one example embodiment. The two color layers are sandwiched between the other compartments of the disclosed electrochromic device. The structural color materials can be directly coated on an existing ECD or be embedded in electrolyte to form one consolidated structural color layer when the structural color materials comprise insulting structural color materials. An example electrochromic device of the present disclosure has a consolidated structural color layer embedded in electrolyte as shown in FIG. 2. The example electrochromic device 200 includes a first transparent substrate 206, a first transparent electrode 208 disposed on the first transparent substrate 206, a pigmentary color layer 202 disposed on the first transparent electrode 208, a structural color layer embedded in electrolyte 204 disposed on the pigmentary color layer 202, an ion storage layer 210 disposed on the structural color layer embedded in electrolyte 204, a second transparent electrode 212 disposed on the ion storage layer 210, a second transparent substrate 214 disposed on the second transparent electrode 212, and a power supply 218 connected to the first transparent electrode 208 and the second transparent electrode 212. At least one of the color layers (206 and 208) comprises electrochromic materials and the top color layer along the optical path has a transmittance and a thickness, which allows for noticeable angel-dependent light variation. The optical path go through the two color layers 204, 202 as well as the other compartments 206, 208, 210, 212, and 214 in the disclosed electrochromic device. In some embodiments, all the other compartments on top of the structural color layer along the optical path may be transparent.

Figure 3:
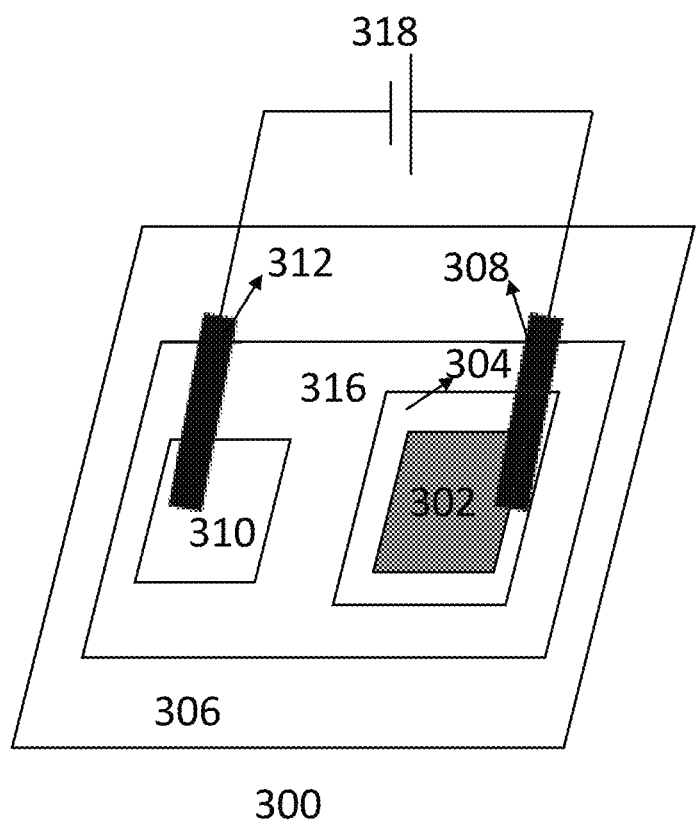
FIG. 3 is a diagram illustrating a perspective view of a lateral structure design of an ECD, according to one example embodiment.

In some embodiments, the electrochromic devices of the present disclosure are depicted in a lateral design. As shown in an example electrochromic device 300 in FIG. 3, the two color layers are placed laterally between two electrodes in the disclosed example electrochromic device. The optical path penetrates the two color layers, electrolyte and the transparent substrates. The optical path do not need to penetrate the two electrodes nor the ion storage layer. In another word, the optical path is not in the same planar with the disclosed electrochromic device. The two electrodes and the ion storage layer do not need to be transparent since they can be out of the optical path. A transparent substrate 306, which may be glass, polyethylene terephthalate (PET) or any other suitable materials transparent in the visible or near IR, is provided with two laterally deposited electrodes 308 and 312. The two color layers, structure color layer 304 and pigmentary color layer 302, are coated directly on one of the electrodes 312. Ion storage layer 310 is deposited on the other electrode 308. Electrolyte solution 316 is spread to cover the entire device. The optical path penetrate the two color layers 302 and 304, electrolyte 316, and the transparent substrate 306 in the disclosed electrochromic device. The optical path do not need to penetrate the two electrodes 308 and 312 nor the ion storage layer 310.

Figure 4:
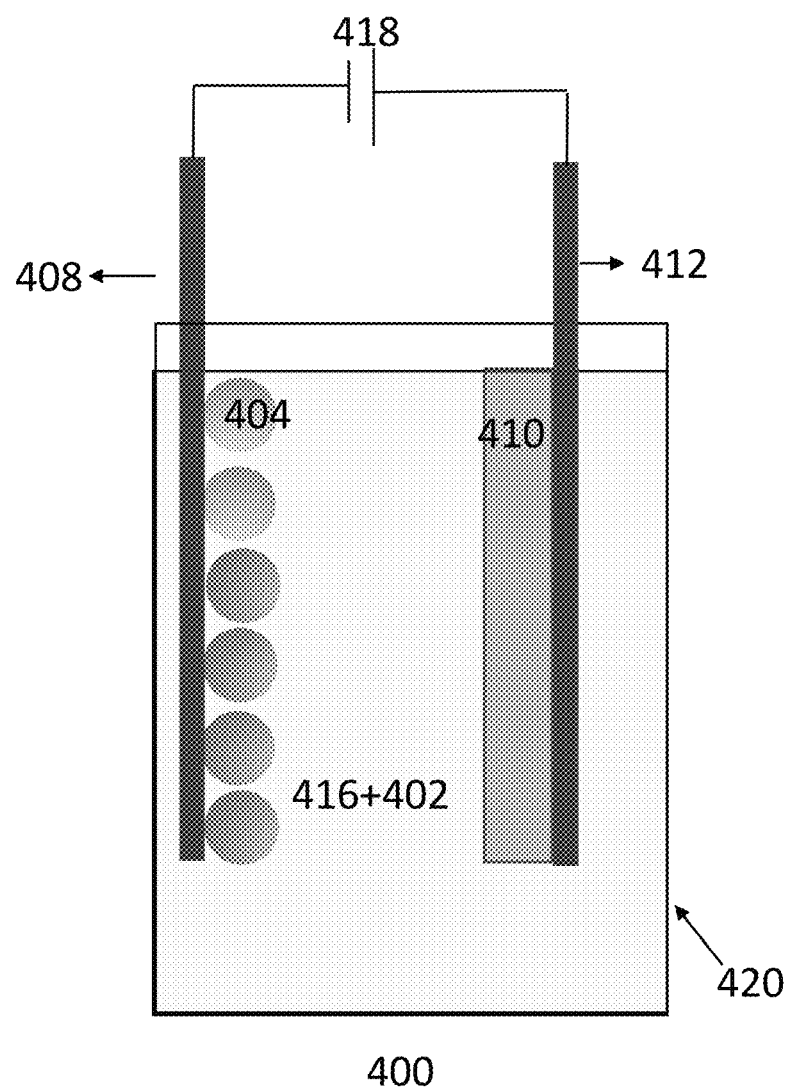
FIG. 4 is a diagram illustrating an example liquid cell structure design of an ECD, according to one example embodiment.

In some embodiments, the electrochromic devices of the present disclosure are depicted in a liquid cell structure design as shown in FIG. 4. In the liquid cell structure design, electrolyte is in a liquid form. The materials for one of the two color layers can be in a liquid form. The liquid cell structure design varies with different physical states of the two color materials. In some embodiments, when the electrolyte is in a liquid form, both color materials can be deposited on the working electrodes with the appropriate color materials on the top. In some embodiments, when one of the color materials is in a liquid form, the liquid color material can be dissolved in electrolyte while the other non-liquid color material is deposited on the working electrode. FIG. 4 shows an example liquid cell device 400 with liquid pigmentary color material. A structure color layer 404 deposited on a first transparent electrode 408, an ion storage layer 410 deposited onto a second transparent electrode 412. The liquid pigmentary material 402 dissolved in the liquid electrolyte 416 is poured into a liquid cell 418. Two transparent electrodes 408 and 412 inserted into the liquid cell 418. The liquid cell device 400 is further sealed for leak free operation.

The electrochromic material in the pigmentary color layer is selected from one or more redox-active inorganic or organic based electrochromic materials, or any combination thereof. Example inorganic pigmentary color materials may be selected from one or more oxides of Ti, V, Nb, Ta, Cr, Mo, W, Mn, Fe, Co, Ir, Ni, Cu, Ce, or Zn or a mixed metal oxide or a doped metal oxide or any combination thereof, among others. Example organic pigmentary color materials may be selected from one or more of viologens including poly (decylviologen) and its derivatives, electrochromic conducting polymers including polypyrrole and its derivatives, polythiophene and its derivatives, poly(3,4-ethylenedioxythiophene) and its derivatives, poly(propylenedioxythiophene) and its derivatives, polyfurane and its derivatives, polyfluorene and its derivatives, polycarbazole and its derivatives, and copolymers thereof, metallopolymers, metallophthalocyanines, or the copolymers containing acceptor units including benzothiadiazole, benzoselenadiazole, benzooxazole, benzotriazole, benzoimidazole, quinoxalines, or diketopyrrolopyrroles, or any combination thereof, among others.

The structural color materials for structural color layers in the described electrochromic devices of the present disclosure may be selected from a group of materials including, but not limit to, materials produced by lithography techniques (for example, magnetic nanoparticles), liquid crystals (for example, cholesteryl benzoate and its derivate, phospholipids, $ZnCl_2$), block copolymers (for example, PS-b-P2VP, PLA-b-PnBA) and colloidal particles (for example, $SiO_2$, ZnO, Ag nanoparticles).

In some embodiments, the pigmentary color layers comprise electrochromic polymer (ECP) as electrochromic materials. ECP can reversibly and quickly regulate the transmitted light and thus control the transparency of the platform by electric-field tuning. In one embodiment, the pigmentary color layer comprises ECP-black, while the structural color layer comprises a non-closed packed $SiO_2$/EG (ethyl glycol) colloidal crystal which present vivid green structural color. Electric field can reversibly and quickly regulate the light coming from the underneath pigmentary color layer and thus control the displayed color of the entire device. Angle-dependent light variation can also be achieved. In the middle of colored-bleached transition process, the coupled color can be visible from relatively small or zero viewing angles while invisible from lager angles.

In some embodiments, both the pigmentary color layer and the structural color layer comprise electrochromic materials. For example, the pigmentary color layer comprises amorphous tungsten oxide, which optical properties can switch between a bleached state and a colored (dark blue) state upon an applied electric field. The structural color layer comprises a semi-transparent polymers (such as polyurethane) with inverse opaline microporous structure. The coupled color can be obtained by layering the polymer on the top of tungsten oxide. Under the actuation of the electric filed, the ions will penetrate into and swell the polymer, which leads to the crystalline distance change and thus color change. By applying different voltages to both amorphous tungsten oxide and the polymer, the described electrochromic device displays various coupled colors and angel-dependent light variation.

In some embodiments, the method of preparing a solid or gel-based electrochromic device of present disclosure comprises, forming two thin film color layers with one pigmentary color layer and one structural color layer, sandwiched or laterally deposited between two electrodes with an ion storage layer deposited directly on the counter electrode, adding electrolyte to form a closed electric circuit and fixation of the electrolyte. The two color layer thin film can be placed either directly adjacently or spaced by other compartments. When there is any insulting structure color materials, structural color materials can be either embedded in the electrolyte or be directly coated on an existing ECD.

In some embodiments, the method of preparing a liquid cell electrochromic device of present disclosure varies with different color materials. In some embodiments, when the electrolyte is in a liquid state, depositing the two color layers on the working electrode with the top layer has a transmittance and a thickness, which allows the disclosed ECD to display versatile color expression as well as noticeable angel-dependent light variations for corresponding applications, depositing an ion storage layer on the counter electrode, adding electrolyte, and sealing of the device. In some embodiments, when one of the color materials is in a liquid form, mixing the liquid color materials with liquid electrolyte, depositing the other color materials on the working electrode, depositing an ion storage layer on the counter electrode, adding the mixture solution of electrolyte and liquid color materials, and sealing of the device.

In some embodiments, the method of preparing an electrochromic device of present disclosure involves another existing electrochromic device. Structural color layer can be deposited directly on the existing electrochromic device to form a thin film.

In some embodiments, the depositing processes with solvent dissolvable color materials coated into films can be realized with any one of a variety of conventional solution-compatible coating techniques, including, but not limited to, ink-jet printing, spray coating, spin coating, slot-die coating, slit coating, roll-to-roll coating, transfer coating, and wire bar coating.

Figures 5A, 5B:
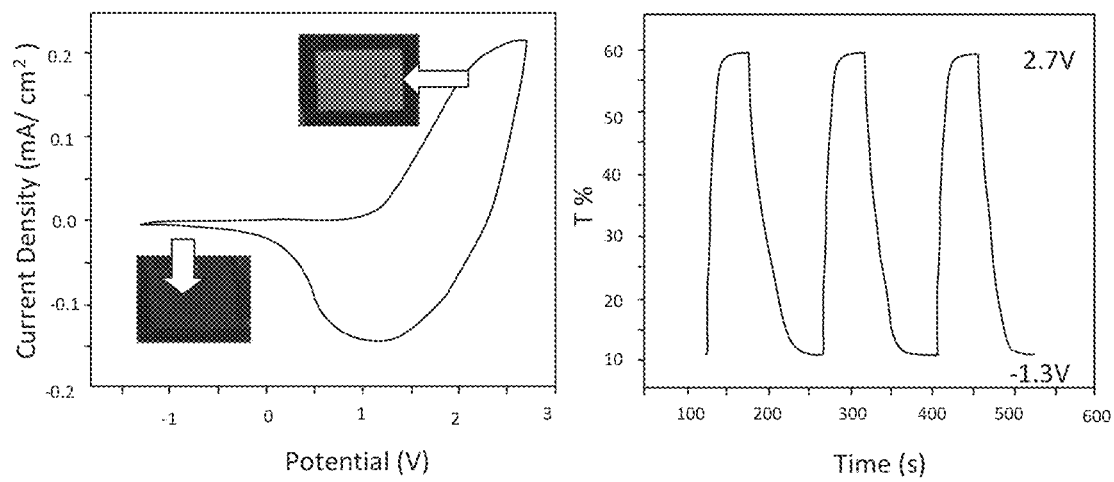
FIG. 5(A) shows a cyclic voltammogram with images at colored states and bleached states.
FIG. 5(B) shows transmittance changes at 550 nm when the voltage switches between −1.3 V to 2.7 V, according to some embodiments of the disclosure.

In some embodiments, the pigmentary color layers comprise electrochromic materials, such as electrochromic polymers (ECPs), as the energy storage material that can reversibly and quickly regulate the transmitted light and thus control the transparency of the platform by electric-field tuning. In some embodiments, the pigmentary color layer comprises acrylate-substituted propylenedioxythiophene (ProDOT) polymers with various colors, for example ECP-black. In some embodiments, ECP-black as pigmentary color layer is placed on the back of the structural color layer along the optical path. Electric field can reversibly and quickly regulate the light coming from the underneath pigmentary color layer and thus control the displayed color of the entire device. Insertions of FIG. 5(A) show the images of ECP-black that can reversibly switch between colored states and bleached states as it is oxidized and reduced, also as shown by the transmittance changes at 550 nm in FIG. 5(B).

Figure 6A:
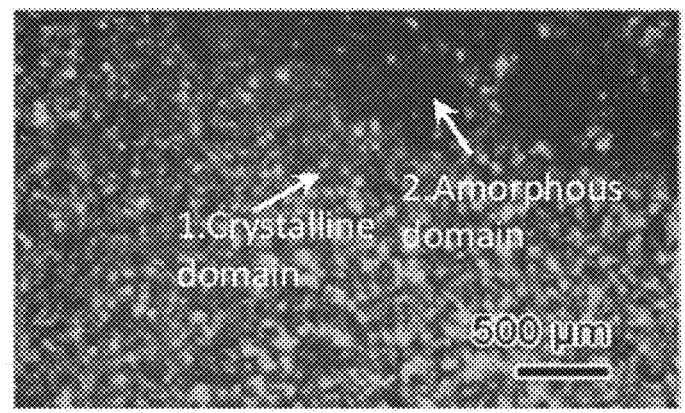
FIG. 6(A) is an optical microscope image.
Figure 6B:
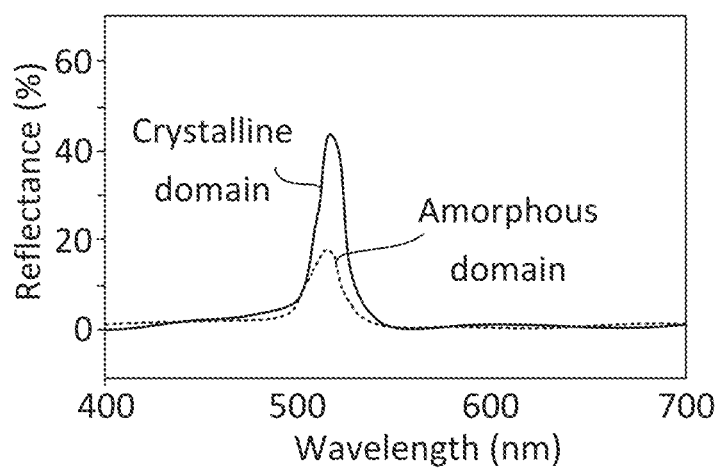
FIG. 6(B) illustrates reflectance spectra.
Figures 6C, 6D:
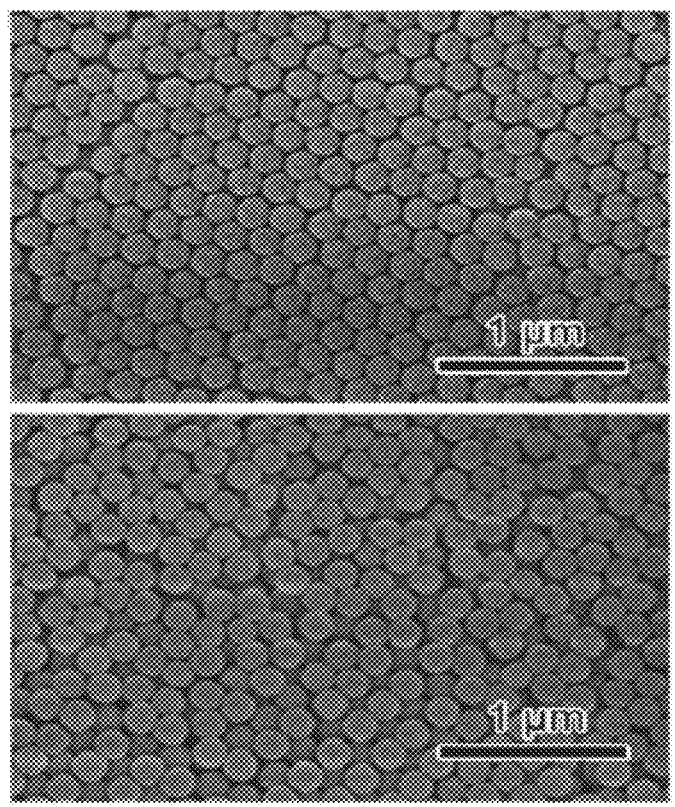
FIG. 6(C) is SEM image of the crystal domain of the metastable colloidal crystal.
FIG. 6(D) is SEM image of the amorphous domain of the metastable colloidal crystal, according to some embodiments of the disclosure.

In some embodiments, the structural color layers comprise non-closed packed $SiO_2$/EG (ethyl glycol) colloidal crystal consisted of 40% monodispersed silica nanoparticles and 60% EG/PEGDA gel matrix which include both crystalline domains and amorphous domains. The optical microscope image in FIG. 6(A) clearly shows the phase separation of crystalline domains, and amorphous domains. The crystalline domains comprise periodically arranged silica nanoparticles and yield vivid green as shown by bright spots with arrow 1, while amorphous domain comprises randomly dispersed nanoparticles, thus displays dark area as shown by arrow 2. FIG. 6(B) shows the reflectance spectra of the metastable colloidal crystal. The crystalline domains give rise to vivid green structure color by high reflectance of nearly single-wavelength light (~530 nm) as shown by the solid line, while low reflectance of the amorphous domains, shown by dashed line, form unobstructed light pathway for the underneath pigmentary color layer. To help understand two domains from molecular level, SEM images from FIG. 6(C) and FIG. 6(D) demonstrate their structure difference. The SEM image from FIG. 6(C) shows crystal domain as silica nanoparticles self-assembled into crystal structure, while the SEM image from FIG. 6(D) shows the homogenous amorphous gel matrix as non-periodical arrangement of silica nanoparticles dispersed in the EG/PEGDA.

Figure 7:
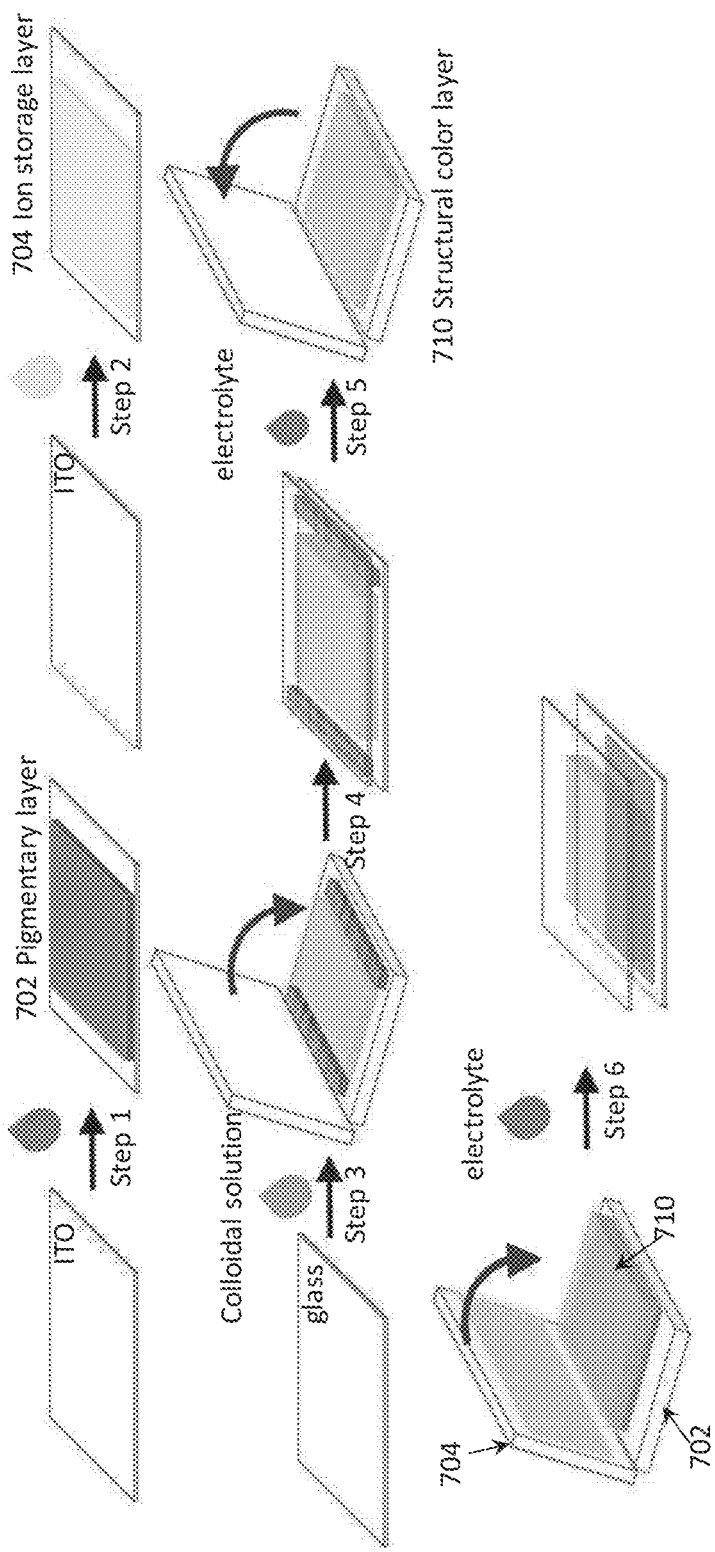
FIG. 7 is the flow diagram illustrating a fabrication process for forming an electrochromic device in a sandwich structure design, according to one example embodiment.

In one example embodiment, the method of preparing a sandwich structure ECD of the present disclosure with ECP-black for pigmentary color layer and a non-closed packed $SiO_2$/EG (ethyl glycol) colloidal crystal for structure color layer comprises multiply steps as shown in FIG. 7. Step 1 is the preparation of a pigmentary color layer 702 with ECP-black on an ITO coated glass, step 2 is the preparation of an ion storage layer 710 with $Nb_2O_5$ on an ITO coated glass, step 3-5 are the preparation steps of structural color layer 704 by forming a colloidal crystal layer embedded in electrolyte, step 6 is the final assembling process of the two color layers (702 and 704) and ion storage layer 710 and other compartments. Each step (except step 1 and 2) is operated inside a nitrogen-filled glovebox. Preparation of pigmentary color layer with ECP-black 702 on an ITO coated glass comprises: dissolving ECP in the chloroform to form 40 mg/ml ECP/chloroform solution, followed by spin-coating of the ECP/chloroform solutions on an ITO coated glass with spin speed of 1500 RMP and drying inside an oven at 900 to form an ECP thin film (step 1) with an appropriate thickness which not affects the minimum amount of transmittance when the device is colored. Preparation of an ion storage layer 710 with $Nb_2O_5$ on an ITO coated glass comprises: preparation of $Nb_2O_5$ thin films using niobium ethoxide solution via the sol-gel reaction on to an ITO coated glass, annealing at 150° C. for 10 min, and removing organic residues by ultraviolet ozone for 20 mins. Preparation of the structural color layer 704 comprises: dispersing $SiO_2$ particles evenly in the mixture of EG (ethylene glycol, 4.5%), PEGMA (poly(ethylene glycol) methacrylate, 1.5%) and ethanol (94%) at room temperature, removing ethanol in an oven at 90° C. for 2 h to form a supersaturated $SiO_2$/EG colloidal solution, placing supersaturated $SiO_2$/EG colloidal solution sandwiched between two pieces of glass with some certain interval (step 3). After the colloidal solution is spread out evenly within the hallow channel between two pieces of glass and sits without disturbance for 10 minutes to allow some of $SiO_2$ nanoparticles to participate out to form crystalline domain while others remain dissolved in the solvent as amorphous domain, then this phase separation structure is fixed by crosslinking after being shined under commercial UV light for 10 minutes (step 4). To make patterned devices, for example the device with octopus pattern in FIG. 16 and the device with butterfly pattern shown in FIG. 17, a hallow patterned sticky photo mask with a special pattern (for example octopus or butterfly) is placed on top of colloidal crystal solution before UV curing. The colloidal solution not covered by the mask then forms a solid gel with some of the $SiO_2$ nanoparticles to participate out to form crystalline domain and some are still evenly dissolved in the solvent as the amorphous domain.

After UV, the remaining liquid colloidal solution under the covered part of mask is washed away, leaving behind the patterned solid gel. Gel Electrolyte is prepared by mixing PEGDA$_{500}$, 0.2 M LITFSI/PC in volume ratio of 1:1 and stirred overnight in a nitrogen-filled glovebox. Sufficient electrolyte is then added and fixed to embed the formed structural color layer with electrolyte (step 5). The colloidal crystal embedded in electrolyte as structural color layer 704 is then sandwiched between the pigmentary layer 702 deposed on an ITO coated glass formed in step 1 and ion storage layer 710 deposed on another ITO coated glass formed in step 2 to form the final sandwich structure (step 6). Additional electrolyte is added and fixed in step 6 to form a stable and closed electric circuit.

Figure 8A:
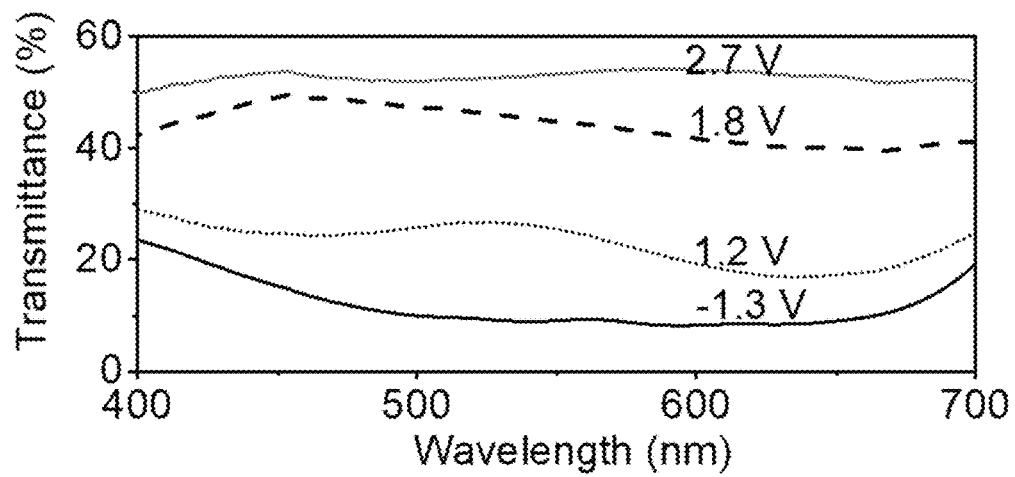
FIG. 8(A) is transmittance spectra of ECP-black as pigmentary color.
Figure 8B:
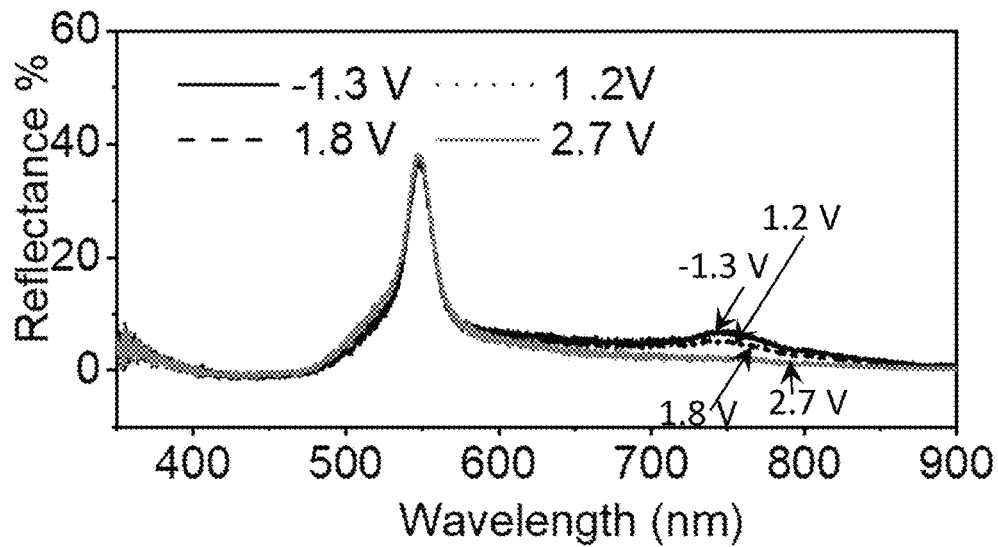
FIG. 8(B) is reflectance spectra of the colloidal crystal as structural color, according to some embodiments of the disclosure.

In some embodiments, the underneath pigmentary color layer comprises ECP-black electrochromic material, and the structural color layer, on the top of pigmentary color layer along the optical path, comprises a non-closed packed SiO$_2$/EG (ethyl glycol) colloidal crystal and no electrochromic material. The pigmentary color layer comprises electrochromic material, ECP-black, which can switch between colored state and bleached state. In colored state of ECP-black with a voltage of −1.3 V, ECP-black has low transmittance over the entire visible range as shown by the lowest transmittance curve in FIG. 8(A), which means very limited light can penetrate the pigmentary color layer. Thus, in colored state, the pigmentary color layer shows the color of ECP-black (for example black in this embodiment), shown by the image of ECP-black at colored state as the lower left insertion of FIG. 5(A). In contract, in bleached state of ECP-black with a voltage of 2.7V, the ECP-black gets oxidized and its absorption peak is red shifted which makes it gradually transparent, as shown by the highest transmittance curve in FIG. 8 (A) and the image of ECP-black at bleached state as upper right insertion in FIG. 5(A). The bleached state can again be switched back to colored state by applying a negative bias (−1.3 V) with the reduction of electrochromic polymer, thus the reflection dominates again for the electrochromic device. This change can also be tuned in steps with different voltages, thus to realize a greyscale change, as shown by the color changing images at different voltages from −1.3V to 2.7V in FIG. 9 (A)-(F), according to one example embodiment.

Figure 10A:
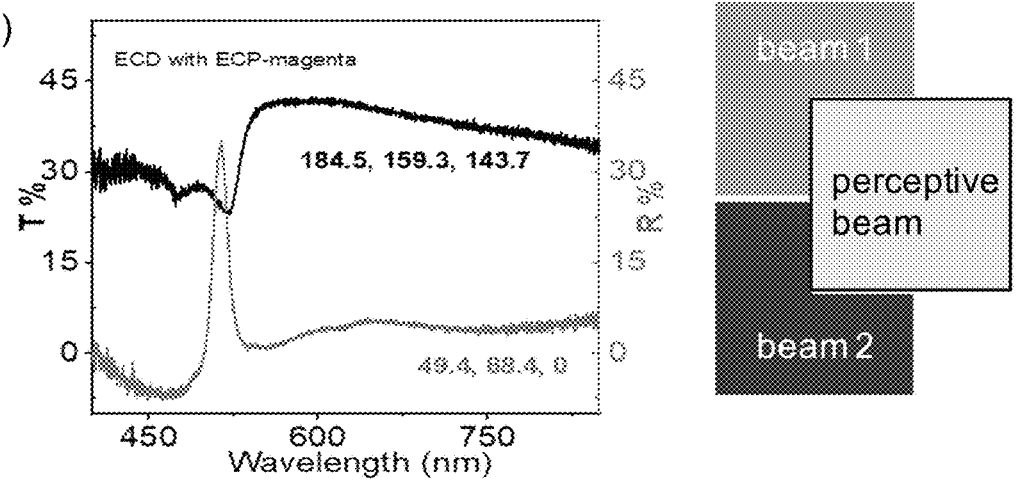
FIGS. 10 (A)-(C) contain the following graphs of the disclosed example electrochromic devices when ECPs are at bleached states, wherein the electrochromic devices comprise green colloidal crystal as the structural color layers and various ECPs as the pigmentary color layers: the spectra of the devices which comprise ECP-magenta (illustrated in FIG. 10(A)) or ECP-green (FIG. 10(B)) or ECP-blue (FIG. 10(C)).
Figure 10B:
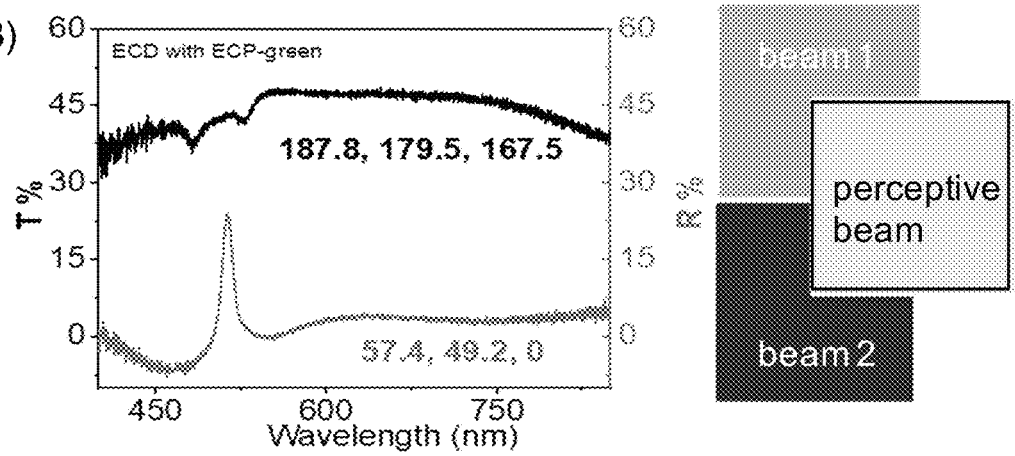
Figure 10C:
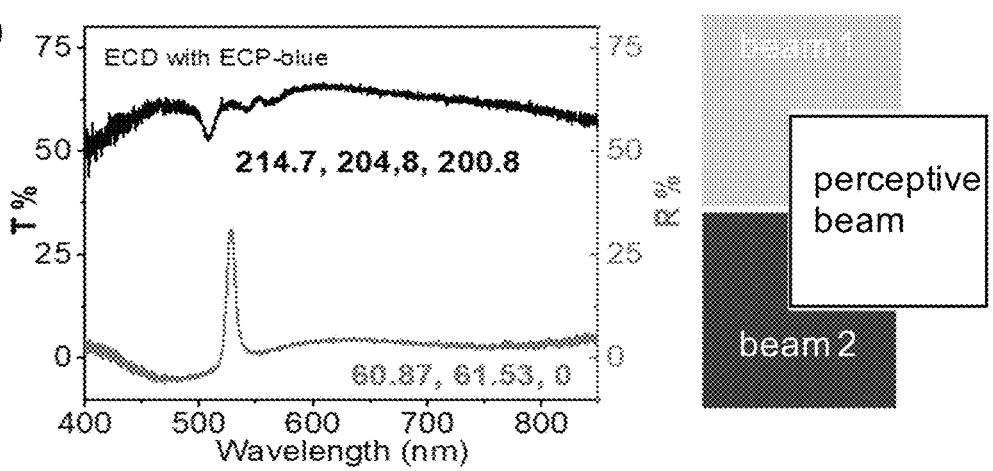
Figure 11A:
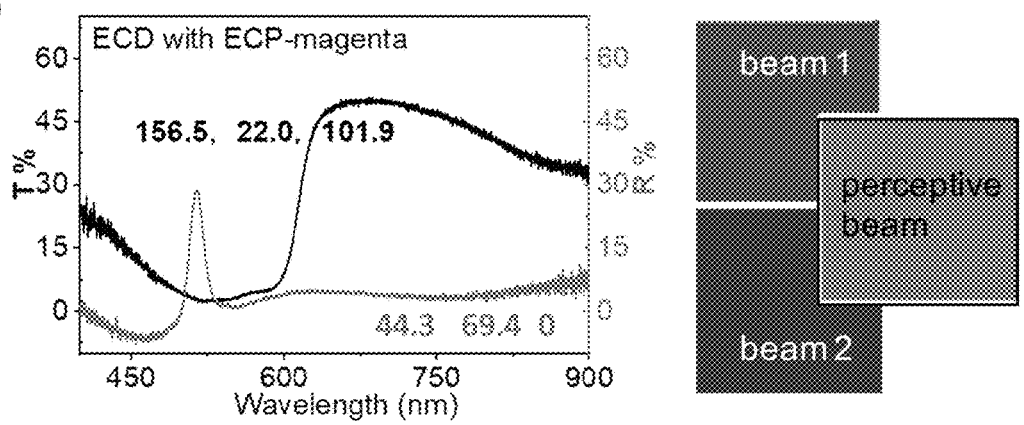
FIGS. 11 (A)-(C) contain the following graphs of the disclosed example electrochromic devices when ECPs are at colored states, wherein the electrochromic devices comprise green vivid colloidal crystal as the structural color layers and various ECPs as the pigmentary color layers: the spectra of the devices which comprise ECP-magenta (illustrated in FIG. 11(A)) or ECP-green (FIG. 11(B)) or ECP-blue (FIG. 11(C)).
Figure 11B:
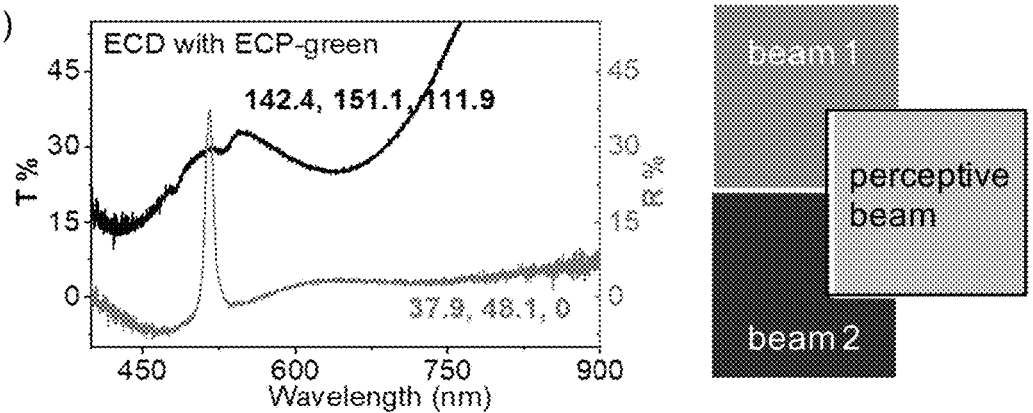
Figure 11C:
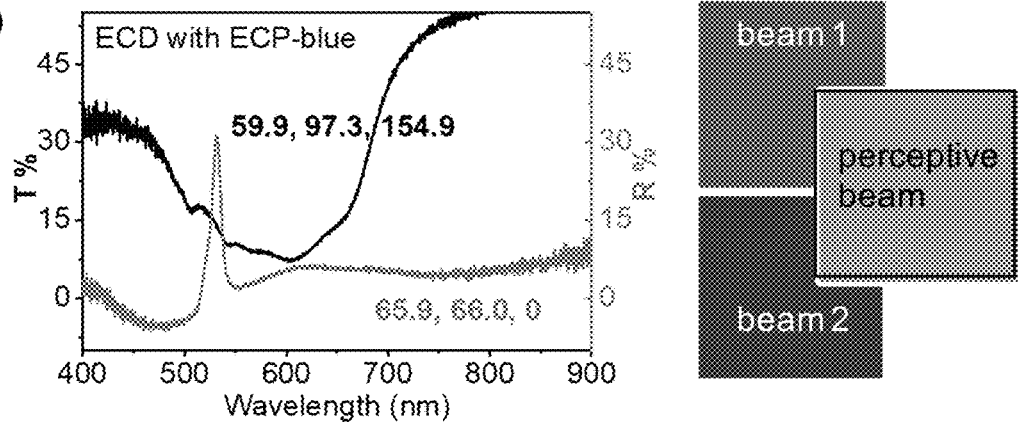

Color coupling between two color layers could generate more versatile colors to enhance the color expression. In some embodiments, different ECPs (at colored states, ECP-magenta shows purple color, ECP-green shows green color, and ECP-blue shows blue color) are used as the pigmentary color layers and paired with green colloidal crystal as the structural color layer respectively to demonstrate the color interactions between two color layers. The spectra of the electrochromic devices and the displayed color blocks from three different systems are recorded and compared in FIGS. 10(A)-(C) (when ECPs are at bleached states) and FIGS. 11(A)-(C) (when ECPs are at colored state) with FIG. 10 (A) for ECD containing ECP-magenta, FIG. 10(B) for ECD containing ECP-green, FIG. 10(C) for ECD containing ECP-blue. The black lines correspond to transmittance and grey lines correspond to reflectance. Black numbers are the R, G, B values calculated from transmittance spectra of ECD and grey numbers are those values calculated from reflectance spectra of ECD. The corresponding colors of each set of R, G, B values are represented on the right by beam 1 as transmittance of ECD and beam 2 as reflectance of ECD, respectively. The perceptive color blocks on the very right side are predicted by adding R, G, B values from beam 1 and beam 2. FIGS. 11(A)-(C) show, when ECPs are at colored states, combining two kinds of colors can produce more colors which cannot be produced alone by neither electrochromic polymer nor colloidal crystal. Compared with FIGS. 11(A)-(C), spectra detection and color calculations in FIGS. 10(A)-(C) show that the color addition is less affected by adding of colloidal crystal when ECPs are at bleached states. This is because in a bleached state of each polymer, the transmitted white light from underneath ECPs will dominate the eye perception and pales the reflected light from structure color.

Figure 12A:
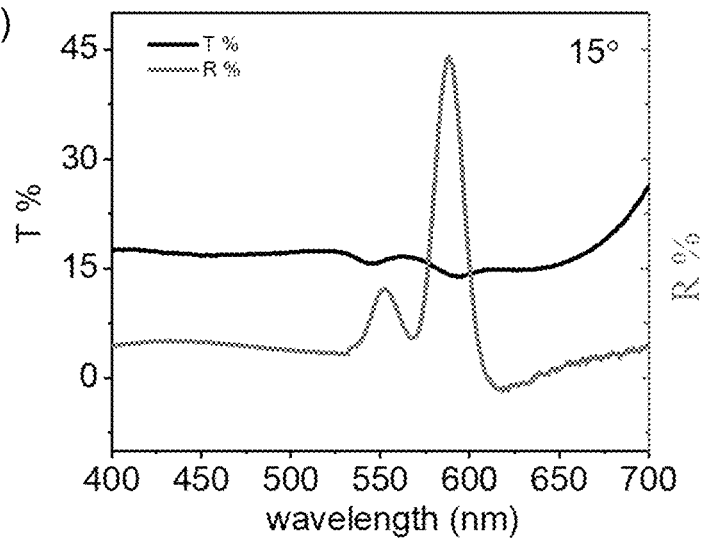
FIGS. 12 (A)-(B) are the corresponding transmittance and reflectance spectra of the example electrochromic device comprising ECP-black at small angel 15° (FIG. 12(A)) and large angel 60° (FIG. 12(B)) wherein the black lines represent transmittance while the grey lines represent reflectance.
Figure 12B:
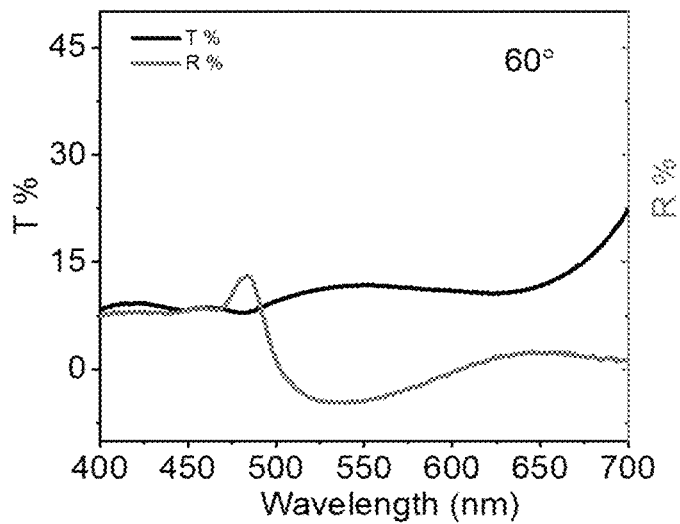
Figure 13A:
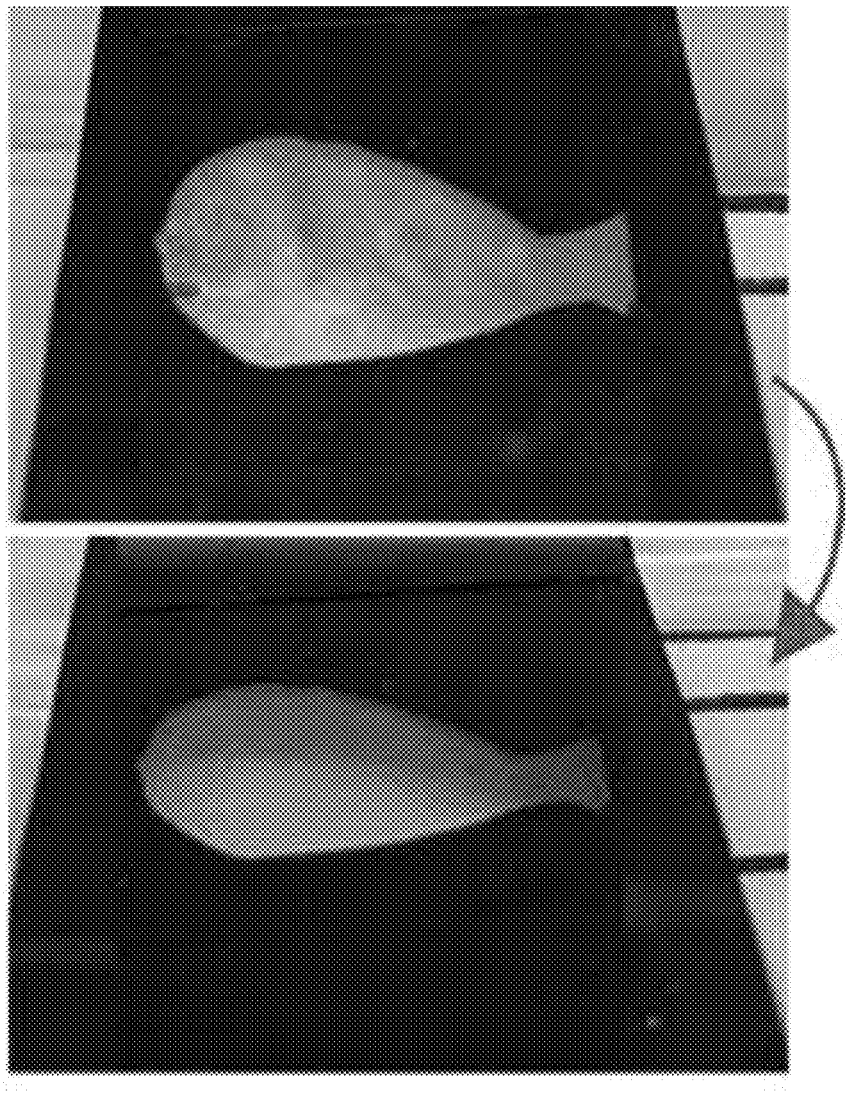
FIGS. 13 (A)-(B) are images showing the coupled color and visibility change at two different viewing angles of a fish-shaped electrochromic device, small viewing angel (FIG. 13(A)) and large viewing angel (FIG. 13(B)), according to one example embodiment.
Figure 13B:
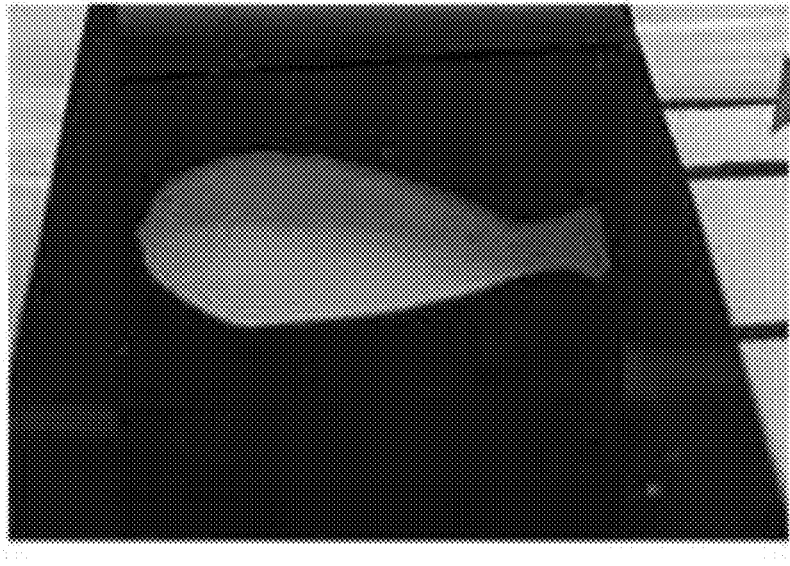

Besides the color coupling and transparency control mentioned above, angle-dependent light variation can also be achieved by the described electrochromic device of the present disclosure. In the middle of colored-bleached transition process, the coupled color can be visible from relatively small or zero viewing angles while invisible from lager angles as show by the schema in FIG. 1(B). The transmittance of ECPs remains the almost same at different incident angles as shown by the black lines in FIG. 12 when applying a voltage of 1.2V. The colloidal crystal structural color layer shows a higher reflection at low incident angle 15° as the grey line in FIG. 12(A), but shows a lower reflection at high incident angle 60° as the grey line in FIG. 12(B). Therefore, in the process of ECP's transition process, the color from large incident angle would disappear firstly, and the entire device color turns from visible to invisible with increasing incident angles. This angle-dependent light variation is further demonstrated in FIG. 13(A)-(B) by a fish-shape electrochromic device with ECP-black and green colloidal crystal incorporated as two color layers. When a voltage of 1.2 V is applied, the ECP is in the middle of transition process, a vivid green color can be viewed from the small angle as shown by bright color in the fish in FIG. 13(A). However, by increasing the viewing angle, the fish yielded less vivid color as shown by darker color in FIG. 13(B).

To further demonstrate the intensity changes from the effect of both electric voltages and viewing angles of the present disclosure, an example electrochromic device with ECP-black and green colloidal crystal as two color layers is adopted again. The device is applied with voltages of −1.3 V, 1.2V, 1.7 and 2.5V in steps, so that the ECP-black is brought from the colored state to the bleached state gradually. During these four steps, transmittance (FIGS. 14 (A)-(D)) and reflectance (FIG. 14(E)) of the device are detected from 15° to 75° in steps of 15°. Various transmittance spectra are detected at various voltages of −1.3V (A), 1.2V (B), 1.7V (C), and 2.5V (D). Different lines represent different viewing angle. FIG. 14 show that the transmittance increases (from ~0%-~60%) with the increasing of voltages. Within various viewing angles, the transmittance at the largest viewing angle 75° increase faster than those at other lower viewing angles which are demonstrated by the transmittance curve at 75° goes from the very bottom of the curves at voltage of −1.3 V, 1.2 V, 1.7 V (shown in FIGS. 14 (A)-(C)) to the very top of the curves at voltage of 2.7 V (shown in FIG. 14 (D)). FIG. 14(E) shows the dramatically reflectance decreasing (from >60% to <10%) and shifting to shorter wavelengths with the increase of viewing angles.

The angel-dependent light variation of the present disclosure is also demonstrated by images in FIG. 15. The viewing angles are 0°, 45°, 70° from left to right, and the applied voltages are −1.3 V, 1.5 V, 2.7 V from top to bottom. In the first row (−1.3 V), vivid green color is changed to green-blue and blue when viewing angles change from 0° to 45° and to 70° (illustrated in FIGS. 15 (A)-(C)). Similarly, in the middle row, with a voltage of 1.5 V, angel-dependent light variation can be observed as the green-blue color gradually disappeared in FIGS. 15(D)-(F) when the viewing angles increase. In contract, in the last row, with a voltage of 2.7 V, the device becomes transparent and from any angles, while no significant color change could be observed from any angles.

To further demonstrate the intensity changes from the effect of both electric voltages and viewing angles of the present disclosure, an example electrochromic device with ECP-black and green colloidal crystal as two color layers is adopted again to assess the impacts of the surrounding light on this angle-dependent light variation are shown by the images taken under strong front surrounding light (on the same side of the viewing side) in FIGS. 16(A)-(C) and strong backlight (on the opposite side of the viewing side) in FIGS. 16(D)-(F). The viewing angles are 0°, 45°, 70° from left to right. As show in FIG. 16(A), with the strong front surrounding light on the same side of viewing side, strong reflective intensity is observed and reflected light dominates in the perceived light. Since the reflective intensity from the structural color layer is angle-dependent. FIGS. 16(A)-(C) show angle-dependent light variation among different angles. In contrast, with the strong back surrounding light on the opposite side of viewing side, strong transmittance intensity is observed, and transmitted light dominates in the perceived light. Since the transmittance intensity is not angle-dependent, insignificantly color change could be seen at any angles as shown in FIGS. 16(D)-(F), thus there is no clearly angle-dependent light variation.

The electrochromic device in the present disclosure show camouflage capability with angle-dependent light variation, which is realized through dedicatedly angle control and electric filed tuning, so that the disclosed electrochromic device can selectively express colors according to its position to the information receiver. In some embodiments, the camouflage capability is further demonstrated by the example electrochromic devices with an octopus pattern (as shown in FIGS. 17(A)-(B)) and an butterfly pattern (as shown in FIGS. 18(A)-(C)). The example electrochromic devices incorporate both ECP-black and green colloidal crystal as two color layers. Before the device assembling, the colloidal crystals are printed into the desirable pattern with the help of UV light and photo mask. Then the colloidal crystals are crosslinked under UV light and then be transferred out after opening the glass and washed away the remaining liquid using ethyl glycol solvent. The solidified colloidal crystals are sandwiched between two coated electrodes (ECP-black on the working electrode, ion storage layer on the counter electrode) with extra liquid electrolyte filled in between as well and followed by UV crosslinking again to finish the assembly. Since the compartments form the electrochromic device are flexible, the entire device can be cut into any shape as desired and wearable. As shown in FIG. 17(A), this device mounted on the arm of toy bear shows an octopus shape at a colored state. While with a positive voltage, the ECP-black becomes transparent and the octopus disappears as shown in FIG. 17(B). This show-hide process is reversible with the voltage switching. Similarly, a butterfly-shaped device in flowers can show (as FIG. 18(A)) and partially hide into environment (as FIG. 18(B)) when the ECP-black switch between colored state and partially bleached state with a positive voltage (0.8V). In FIG. 18(B), a partially bleached state is intentionally adopted to show the angle-dependent light variation. With the same positive voltage of 0.8V, the butterfly shape becomes more visible when viewing from a different angle as shown in FIG. 18(C). As demonstrated, any desired patterned devices can be prepared to mimic the animals in nature, and with the electric filed tuning, the platform can easily realize the camouflage by becoming transparent, or mimicking the surrounding color and even producing angle dependent colors. The color coupling endows the device with broader color gamut which enhances the color expression and the electric tunable angle-dependent light variation further facilitate the potential camouflage applications.

Figure 19A:
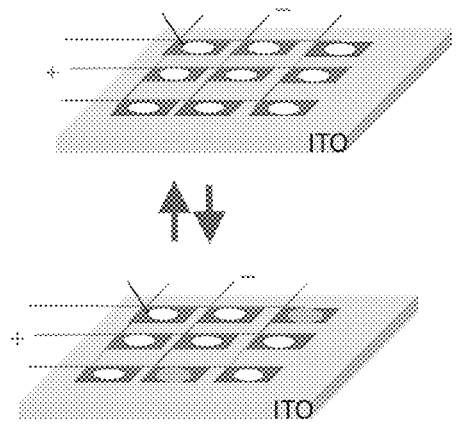
FIG. 19(A) is a schema diagram illustrating a three-by-three arrays of an example multiplex electrochromic device, according to one example embodiment.
Figure 19B:
FIG. 19(B) is an image of this example multiplex device that can be bent.

In some embodiments, multiplex devices can also be prepared with patterned electrode/substrate. FIG. 19(A) shows a scheme of a three-by-three array of multiplex device where each circle represents one electric tunable active area. The patterned electrodes are respectively connected to power source (shown by the "+" and "−"). FIG. 19(B) shows the final device can be bendable which eventually lead to angle diversity within the same multiplex device under single electric-field control. However, the multiplex device can also be electrically tuned by various selective actuation. The angle-dependent light variation of the disclosure as well as its electric tunability can produce even more versatile colors on the multiplex device. FIGS. 19(C)-(F) show images of the three-by-three array multiplex device before (left) and after (right) selectively actuated with multiplied electric fields. These multiplex devices can be used for high-resolution display and camouflage pattern construction after computational programming.

In some embodiments, the method to prepare multiplex devices further comprises a modification process to the substrate before assembling the device. In one example embodiment, the ITO glass or PET-ITO substrates are glued with patterned parallel stripe tapes which have an interval of 2 cm to each other and then are immersed in the 10% HCL solution for 10 minutes. Then the substrates are taken out and washed by DI water for 3 times to remove HCL. Patterned parallel tapes are then peeled off to get patterned ITO substrates.

What is claimed is:

1. An electrochromic device, comprising:
   a pigmentary color layer comprising a pigmentary color material; and
   a structural color layer comprising a structural color material
   wherein:
   the pigmentary color layer further comprises electrochromic materials which allow reversible switches between a colored state and a bleached state by an electric field;
   the electrochromic materials are presented in a closed electric circuit;
   both of the pigmentary color layer and the structural color layer are disposed on an optical path of the electrochromic device; and
   the pigmentary color layer and the structural color layer are disposed one on top of another along the optical path, wherein a top layer of the pigmentary color layer and the structural color layer has a transmittance and a thickness to allow the electrochromic device to produce angel-dependent light variation.

2. The electrochromic device of claim 1, wherein the structural color layer further comprises an electrolyte, wherein the structural color material is embedded in the electrolyte.

3. The electrochromic device of claim 1, wherein the electrochromic device further comprises two electrodes, wherein the pigmentary color layer and the structural color layer are sandwiched between the two electrodes.

4. The electrochromic device of claim 1, wherein the electrochromic device further comprises two electrodes, wherein the pigmentary color layer and the structural color layer are placed laterally between the two electrodes laterally disposed.

5. The electrochromic device of claim 1, wherein the electrochromic device adopts a liquid cell structure design.

6. The electrochromic device of claim 1, wherein the electrochromic device further comprises two electrodes, wherein the pigmentary color layer is interposed between the two electrodes, and the structural layer is disposed on an outer surface of one of the two electrodes.

7. The electrochromic device of claim 1, wherein the electrochromic material in the pigmentary color layer is selected from one or more redox-active inorganic or organic based electrochromic materials.

8. The electrochromic device of claim 1, wherein the structural color material is selected from one or more group of materials including materials produced by lithography techniques, liquid crystals, block copolymers and colloidal particles.

9. The electrochromic device of claim 1, wherein the structural color material comprises a metastable colloidal crystal which includes crystalline domains and amorphous domains.

10. The electrochromic device of claim 1, wherein the structural color material comprises a non-closed packed $SiO_2$/ethyl glycol colloidal crystal.

11. The electrochromic device of claim 1, wherein the pigmentary color layer comprises an electrochromic conjugated polymer.

12. The electrochromic device of claim 1, wherein the pigmentary color layer comprises an electrochromic conjugated polymer, and the structural color layer comprises a non-closed packed $SiO_2$/ethyl glycol colloidal crystal embedded into an electrolyte.

13. A method for making an electrochromic device, the method comprising:
   preparing a pigmentary color layer containing electrochromic materials,
   preparing a structural color layer,
   assembling the electrochromic device such that:
      the electrochromic materials are placed in a closed electric circuit,
      the pigmentary color layer and the structural color layer are placed either directly adjacent to each other or spaced by other compartments, wherein a top layer of the pigmentary color layer and the structural color layer has a transmittance and a thickness to allow the electrochromic device to produce angel-dependent light variation,
      the structural color layer is embedded into an electrolyte or placed as an independent layer.

14. The method of claim 13, wherein the electrochromic device is flexible, and the method further comprises cutting and/or bending each layer of the electrochromic device into shapes before or after the assembly, to form the electrochromic device in a desired shape.

15. The method of claim 13, wherein the method further comprises preparing patterned electrodes.

* * * * *

UNITED STATES PATENT AND TRADEMARK OFFICE
CERTIFICATE OF CORRECTION

PATENT NO. : 10,955,717 B1
APPLICATION NO. : 16/999921
DATED : March 23, 2021
INVENTOR(S) : Chen et al.

Page 1 of 3

It is certified that error appears in the above-identified patent and that said Letters Patent is hereby corrected as shown below:

In the Specification

In Background, Column 1, Line 40:
"angel dependent" should read -- angle dependent --.

In Background, Column 1, Line 45:
"angel-dependent" should read -- angle-dependent --.

In Summary, Column 2, Line 3:
"angel-dependent" should read -- angle-dependent --.

In Summary, Column 2, Line 7:
"angel-dependent" should read -- angle-dependent --.

In Summary, Column 2, Line 8:
"angel-dependent" should read -- angle-dependent --.

In Summary, Column 2, Line 21:
"viewing angels" should read -- viewing angles --.

In Summary, Column 2, Line 46:
"angel-dependent" should read -- angle-dependent --.

In Summary, Column 3, Line 18:
"insulting color materials" should read -- insulating color materials --.

In Summary, Column 4, Line 16:
"angel-dependent" should read -- angle-dependent --.

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*

In Summary, Column 4, Line 20:
"insulting color material" should read -- insulating color material --.

In Summary, Column 4, Lines 47-48:
"angel-dependent" should read -- angle-dependent --.

In Brief Description of the Drawings, Column 6, Line 1:
"small angel" should read -- small angle --.

In Brief Description of the Drawings, Column 6, Line 2:
"large angel" should read -- large angle --.

In Brief Description of the Drawings, Column 6, Line 6:
"viewing angel" should read -- viewing angle --.

In Brief Description of the Drawings, Column 6, Line 7:
"viewing angel" should read -- viewing angle --.

In Brief Description of the Drawings, Column 6, Line 11:
"incident angels" should read -- incident angles --.

In Brief Description of the Drawings, Column 6, Line 16:
"angels changed" should read -- angles changed --.

In Brief Description of the Drawings, Column 6, Lines 18-19:
"angel-dependent" should read -- angle-dependent --.

In Brief Description of the Drawings, Column 6, Lines 24-25:
"angel-dependent" should read -- angle-dependent --.

In Brief Description of the Drawings, Column 6, Line 28:
"FIG. 16(C)-(D)" should read -- FIG. 16(D)-(F) --.

In Brief Description of the Drawings, Column 6, Line 41:
"FIG. 18(B)" should read -- FIG. 18(C) --.

In Detailed Description of Embodiments, Column 7, Line 29:
"angel-dependent" should read -- angle-dependent --.

In Detailed Description of Embodiments, Column 7, Line 40:
"angel-dependent" should read -- angle-dependent --.

In Detailed Description of Embodiments, Column 7, Line 41:
"angel-dependent" should read -- angle-dependent --.

CERTIFICATE OF CORRECTION (continued)
U.S. Pat. No. 10,955,717 B1

In Detailed Description of Embodiments, Column 7, Line 52:
"angel-dependent" should read -- angle-dependent --.

In Detailed Description of Embodiments, Column 8, Line 25:
"incident angel" should read -- incident angle --.

In Detailed Description of Embodiments, Column 8, Line 29:
"incident angel" should read -- incident angle --.

In Detailed Description of Embodiments, Column 8, Line 32:
"angel-dependent" should read -- angle-dependent --.

In Detailed Description of Embodiments, Column 8, Line 53:
"comprises insulting" should read -- comprises insulating --.

In Detailed Description of Embodiments, Column 9, Line 3:
"comprise insulting" should read -- comprise insulating --.

In Detailed Description of Embodiments, Column 9, Line 19:
"(206 and 208)" should read -- (202 and 204) --.

In Detailed Description of Embodiments, Column 9, Lines 21-22:
"angel-dependent" should read -- angle-dependent --.

In Detailed Description of Embodiments, Column 10, Lines 66-67:
"angel-dependent" should read -- angle-dependent --.

In Detailed Description of Embodiments, Column 11, Line 10:
"any insulting" should read -- any insulating --.

In Detailed Description of Embodiments, Column 11, Line 20:
"angel-dependent" should read -- angle-dependent --.

In Detailed Description of Embodiments, Column 14, Line 60:
"angel-dependent" should read -- angle-dependent --.

In Detailed Description of Embodiments, Column 14, Line 67:
"angel-dependent" should read -- angle-dependent --.

In the Claims

In Claim 1, Column 16, Line 59:
"angel-dependent" should read -- angle-dependent --.

In Claim 13, Column 18, Line 19:
"angel-dependent" should read -- angle-dependent --.